J. F. OHMER.
TICKET ISSUING AND AUDITING MACHINE.
APPLICATION FILED MAR. 23, 1916.
1,274,192.
Patented July 30, 1918.
15 SHEETS—SHEET 1.
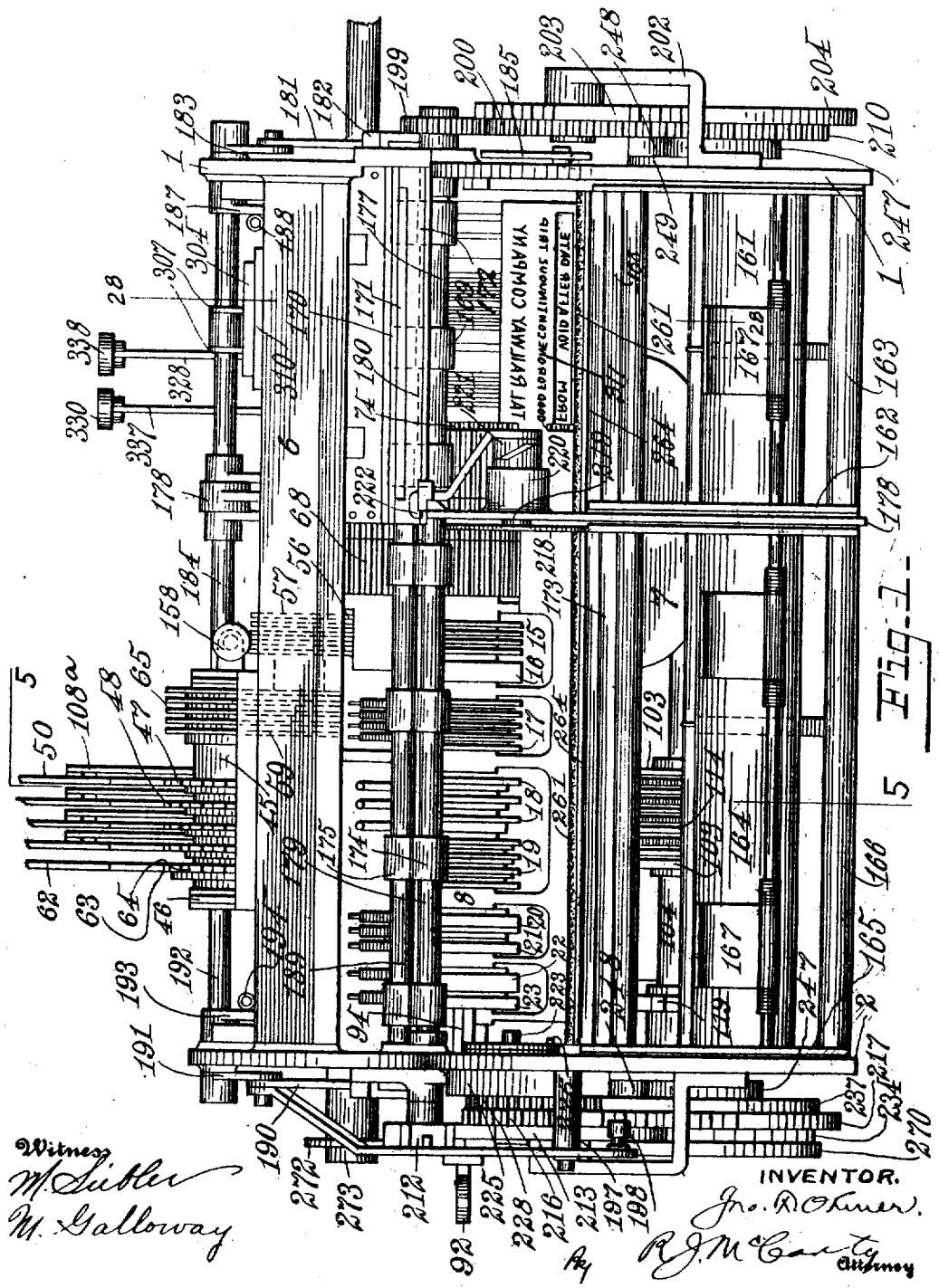

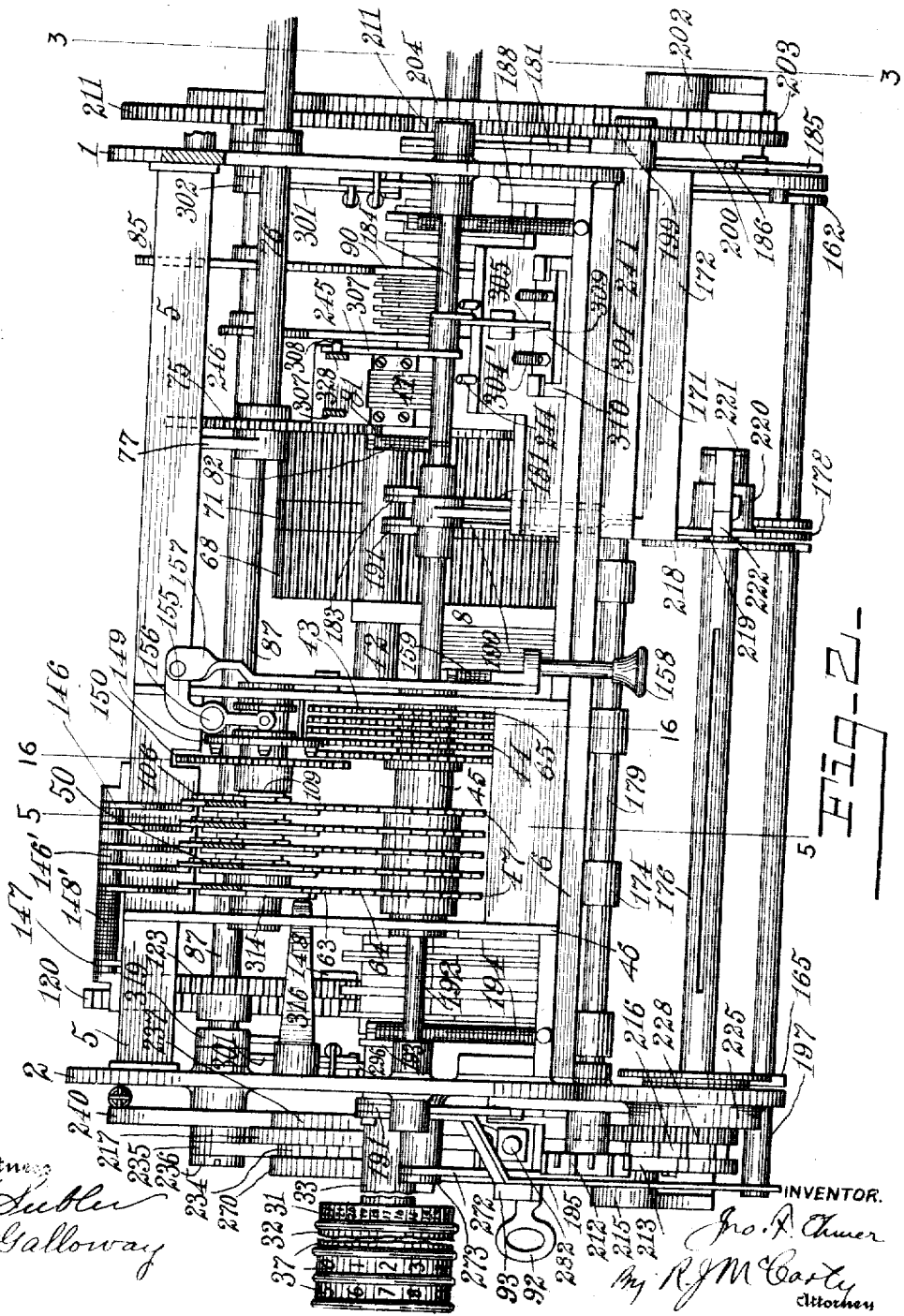

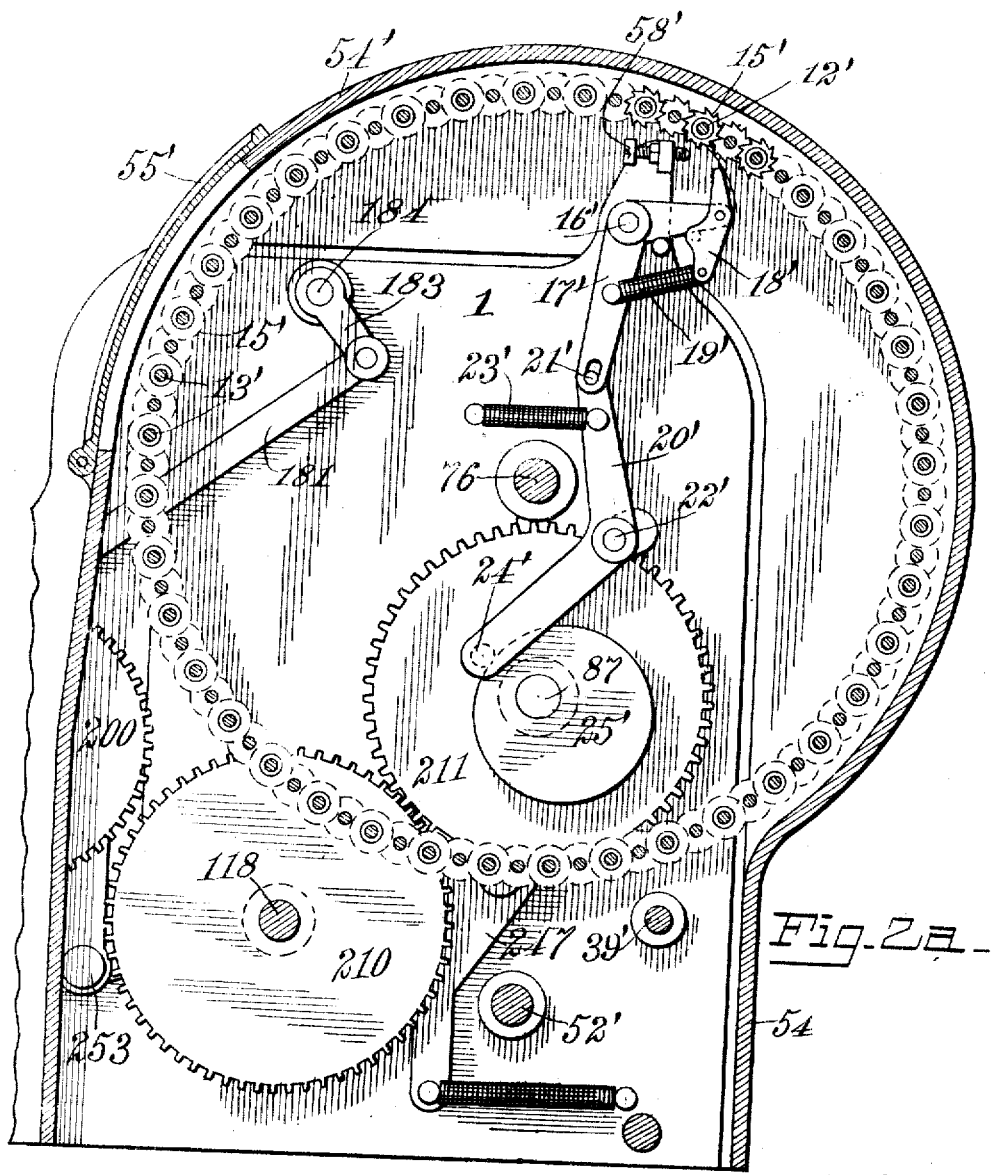

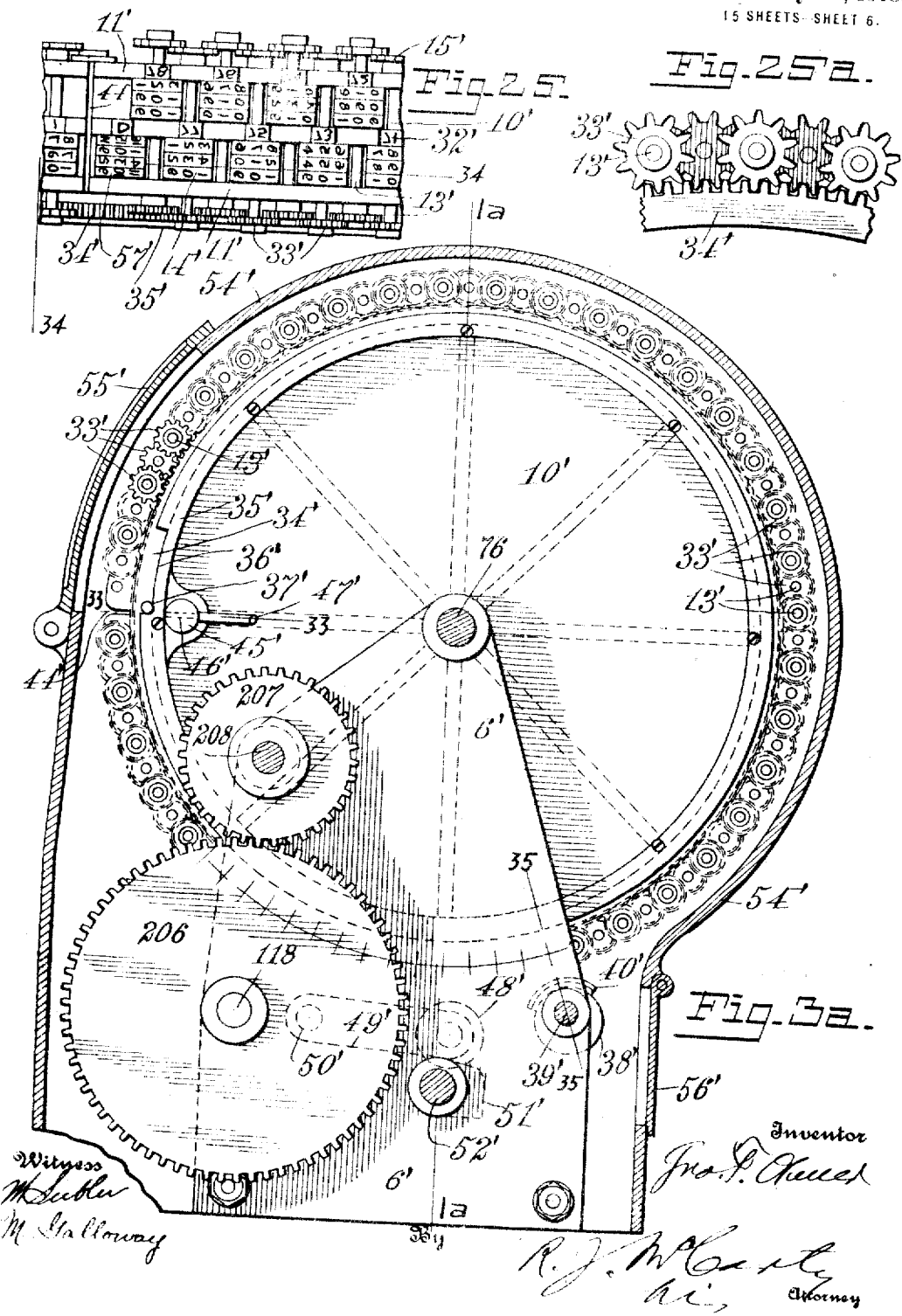

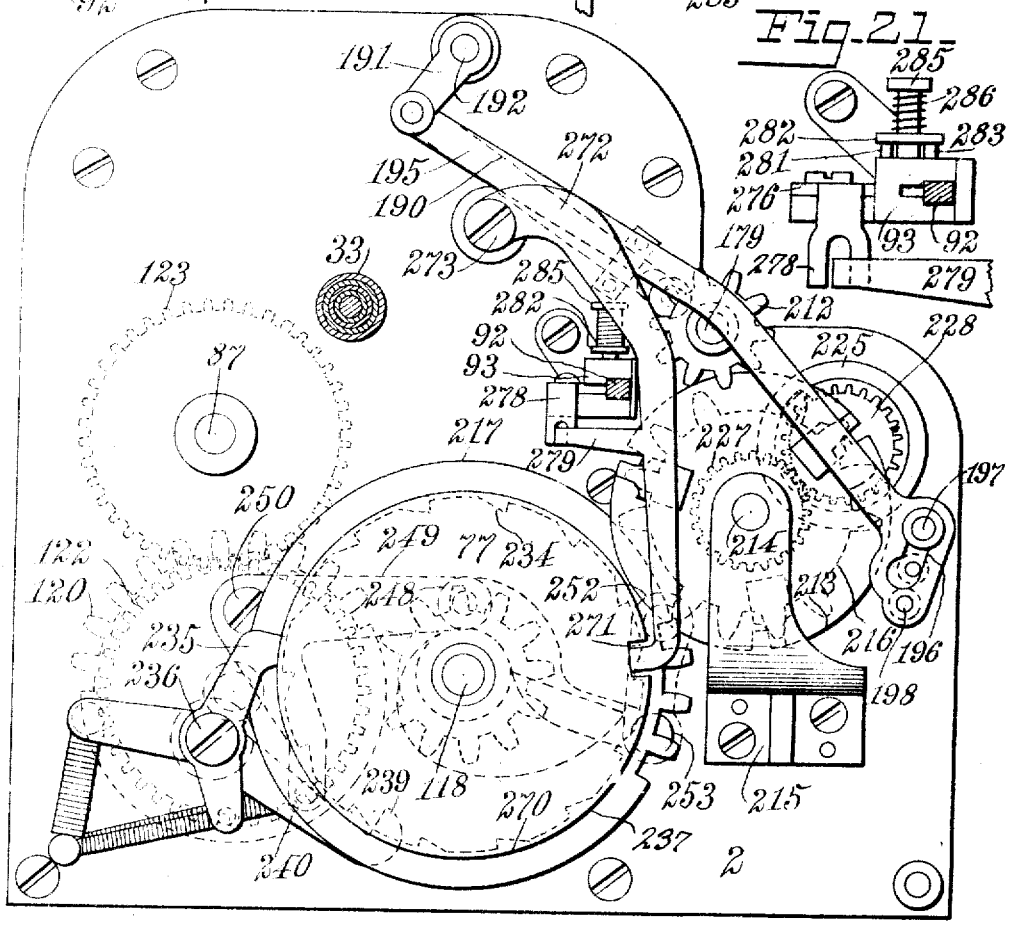

J. F. OHMER.
TICKET ISSUING AND AUDITING MACHINE.
APPLICATION FILED MAR. 23, 1916.
1,274,192.
Patented July 30, 1918.
15 SHEETS—SHEET 8.
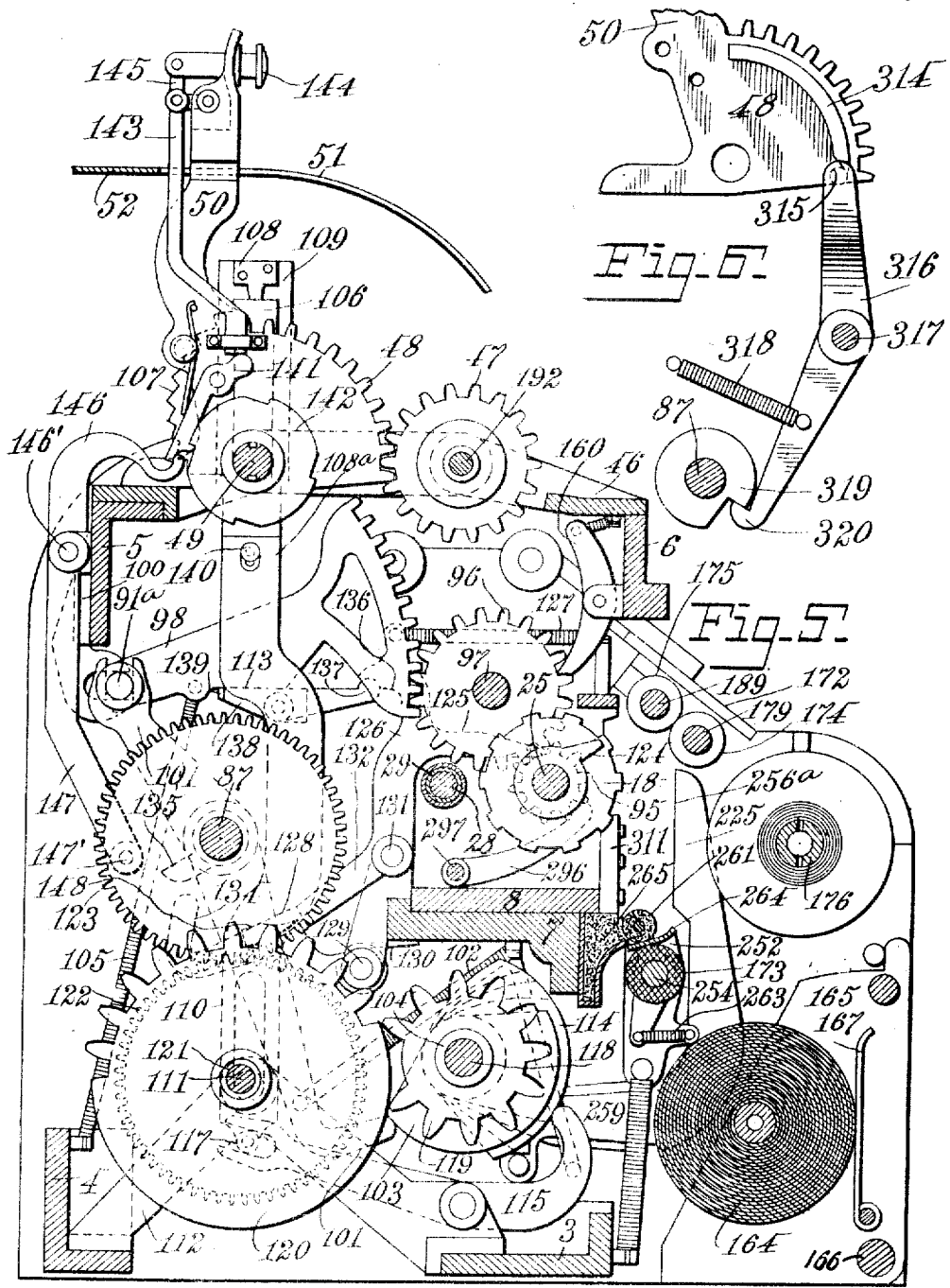

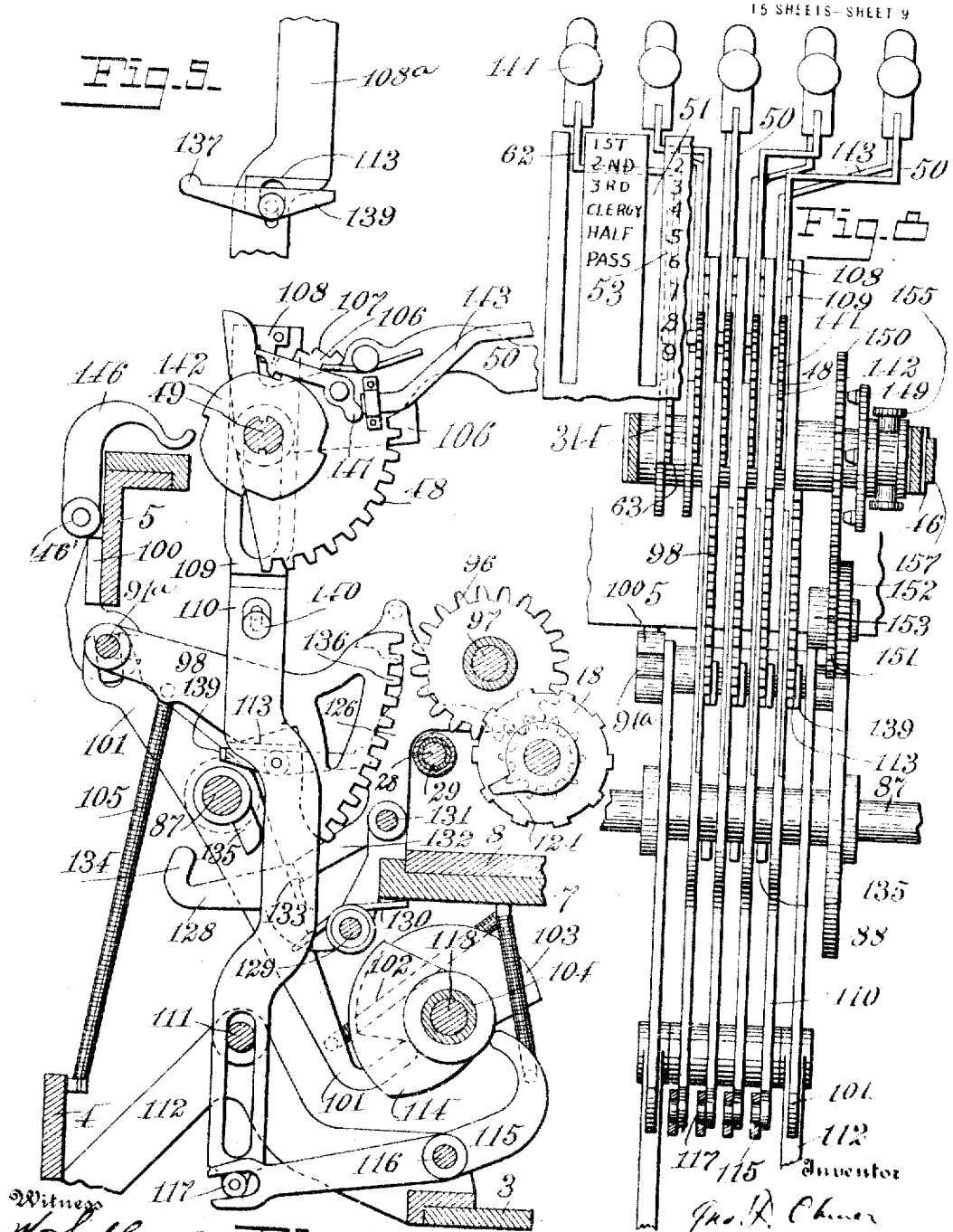

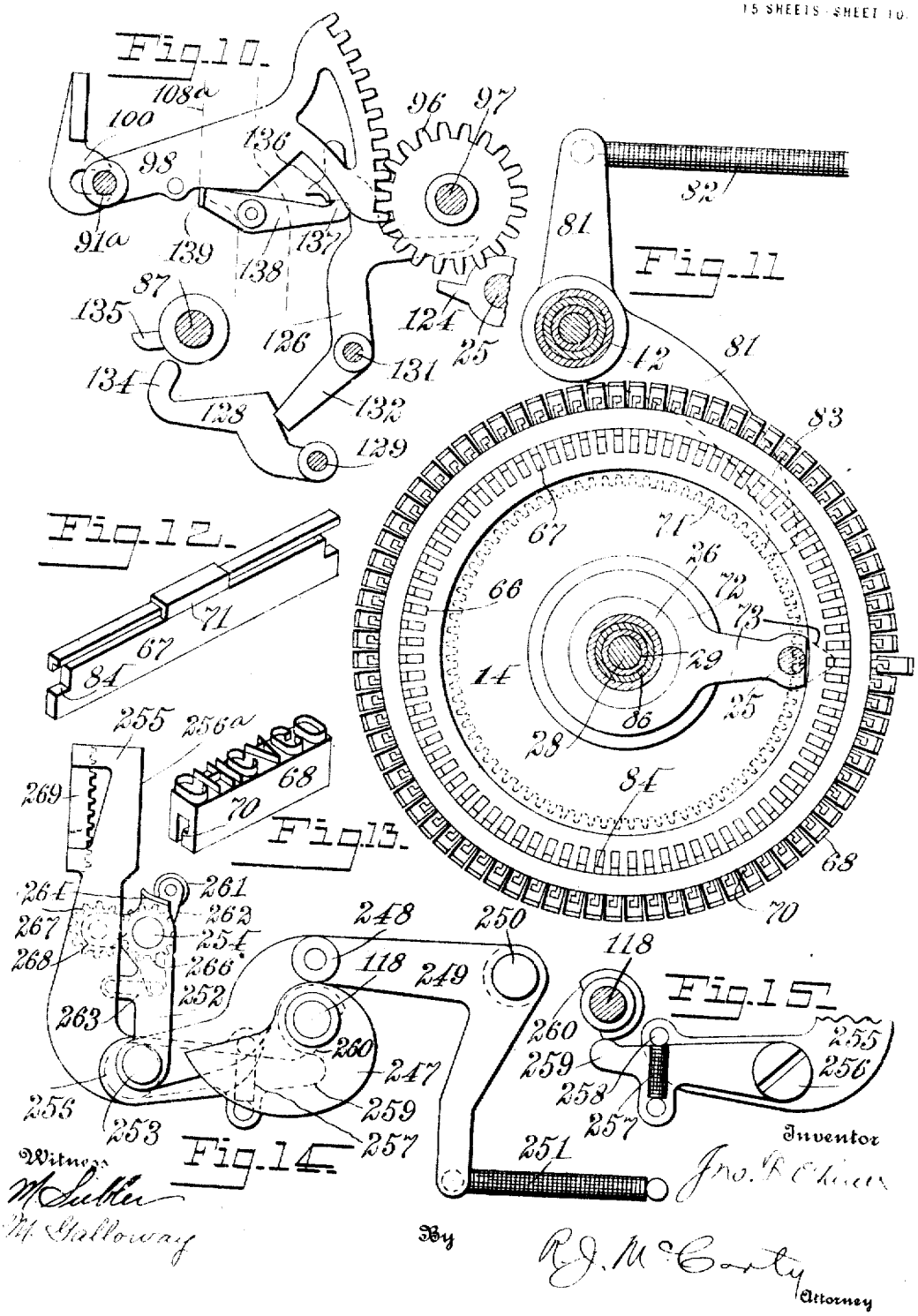

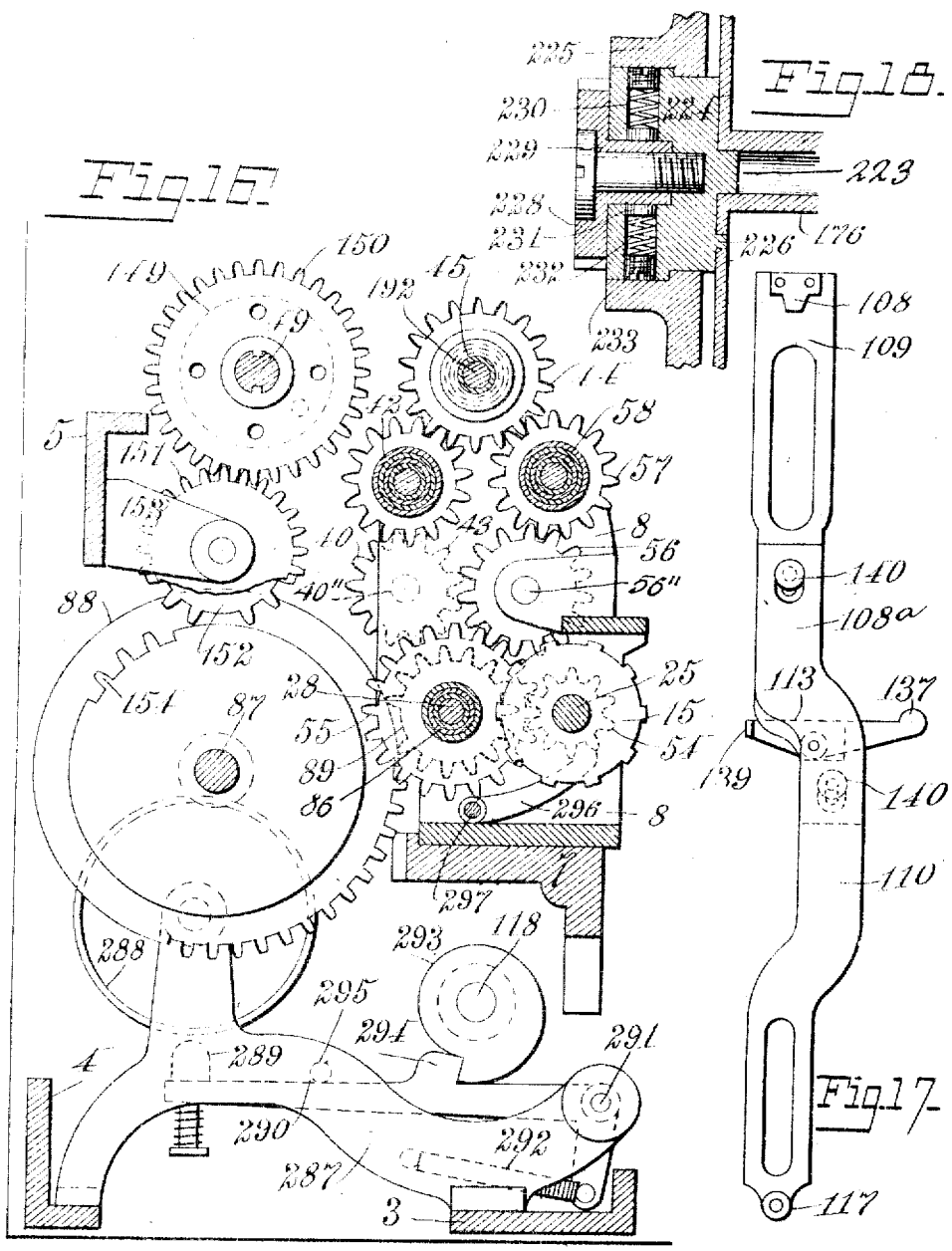

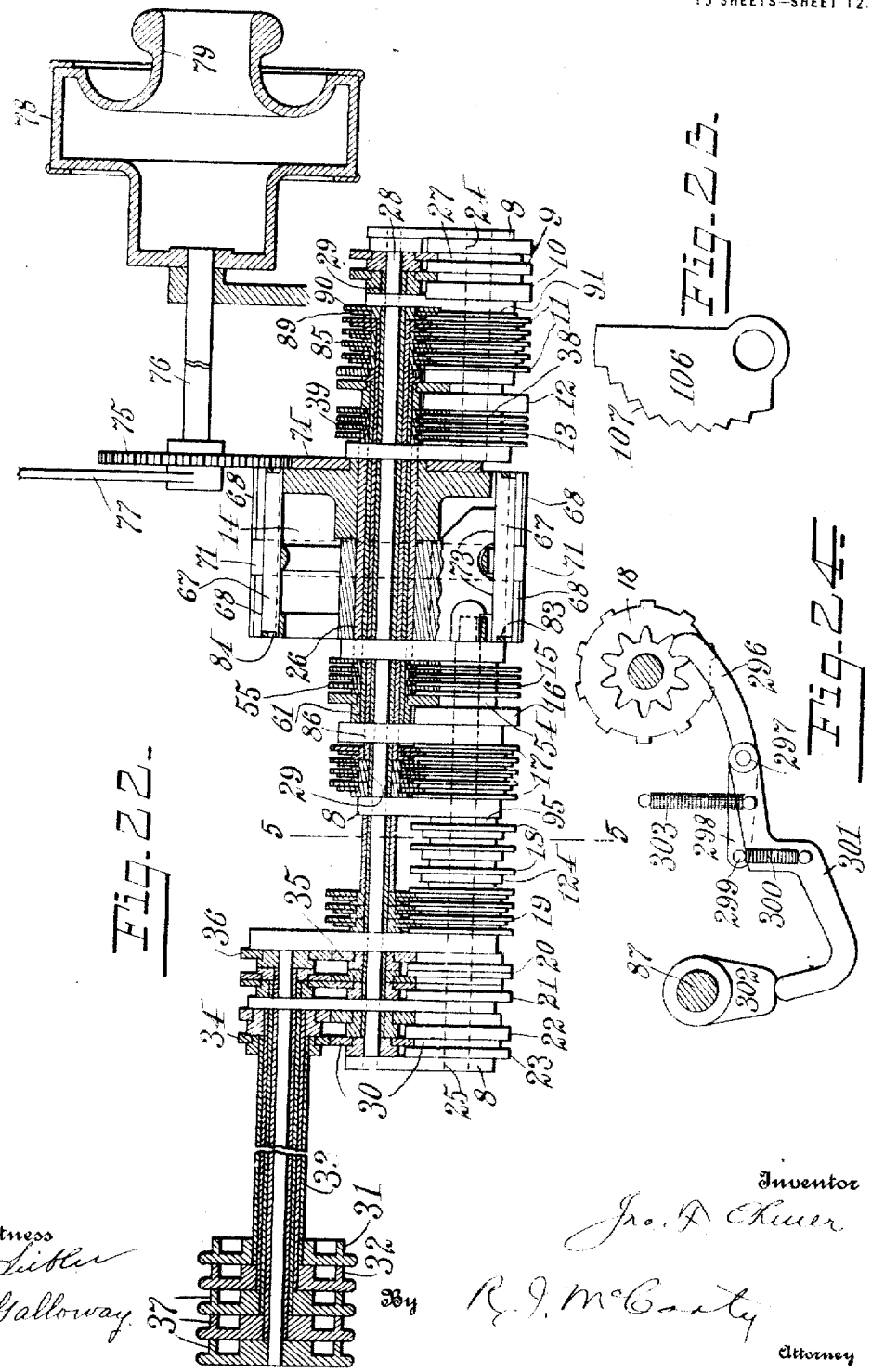

J. F. OHMER.
TICKET ISSUING AND AUDITING MACHINE.
APPLICATION FILED MAR. 23, 1916.

1,274,192.  
Patented July 30, 1918.  
15 SHEETS—SHEET 13.

| A | B | C | D | E | F | G | H | I | K |
|---|---|---|---|---|---|---|---|---|---|
| A7 | 27 | OCT | 11 | 35 | 3291 2 0 1 | 02832 | 1ST | 1273 | CHICAGO |
| A7 | 27 | OCT | 11 | 27 | 3289 9 2 8 | 02831 | 1ST | 0750 | ST. LOUIS |
| A7 | 27 | OCT | 11 | 15 | 3289 1 7 8 | 02830 | 1ST | 0325 | DENVER |
| A7 | 27 | OCT | 11 | 09 | 3288 8 5 3 | 02829 | 1ST | 1720 | TOLEDO |
| A7 | 27 | OCT | 11 | 00 | 3287 1 3 3 | 02828 | 1ST | 2230 | DETROIT |
| A7 | 27 | OCT | 11 | 00 | 3284 9 0 3 | 02827 | 1ST | 2230 | DETROIT |
| A7 | 27 | OCT | 10 | 51 | 3282 6 7 3 | 02826 | ½ | 0098 | AKRON |
| A7 | 27 | OCT | 10 | 32 | 3282 5 7 5 | 02825 | 1ST | 1615 | RICHMOND |
| A7 | 27 | OCT | 10 | 11 | 3280 9 6 0 | 02824 | 1ST | 0937 | COLUMBUS |
| A7 | 27 | OCT | 9 | 45 | 3280 2 2 3 | 02823 | 1ST | 0635 | CLEVELAND |
| A7 | 27 | OCT | 9 | 30 | 3279 3 8 8 | 02822 | CL | 1832 | BOSTON |
| A7 | 27 | OCT | 9 | 13 | 3277 5 5 6 | 02821 | 1ST | 1027 | BUFFALO |
| A7 | 27 | OCT | 9 | 07 | 3276 5 2 9 | 02820 | 1ST | 0316 | ERIE |
| A7 | 27 | OCT | 8 | 43 | 3276 2 1 3 | 02819 | 1ST | 1120 | LONDON |
| A7 | 27 | OCT | 8 | 29 | 3275 0 9 3 | 02818 | 1ST | 0530 | PARIS |
| A7 | 27 | OCT | 8 | 16 | 3274 5 5 3 | 02817 | 1ST | 1525 | BERLIN |
|  |  |  |  |  | 3273 0 3 8 |  |  |  |  |

Fig. 26.

| L | N | O | P | Q | R | S |
|---|---|---|---|---|---|---|
| CLEVELAND | $0635 | 1ST | 02823 | OCT. 27 | 14 | |

CLEVELAND   $0635  1ST   02823   OCT. 27 14
FROM          VOID AFTER DATE
DAYTON OHIO   GOOD FOR ONE CONTINUOUS TRIP
CONTINENTAL RAILROAD COMPANY.

Fig. 27.

Witness: W. Sibler, M. Galloway

Inventor: Jno. F. Ohmer
By R. J. McCarty, Attorney

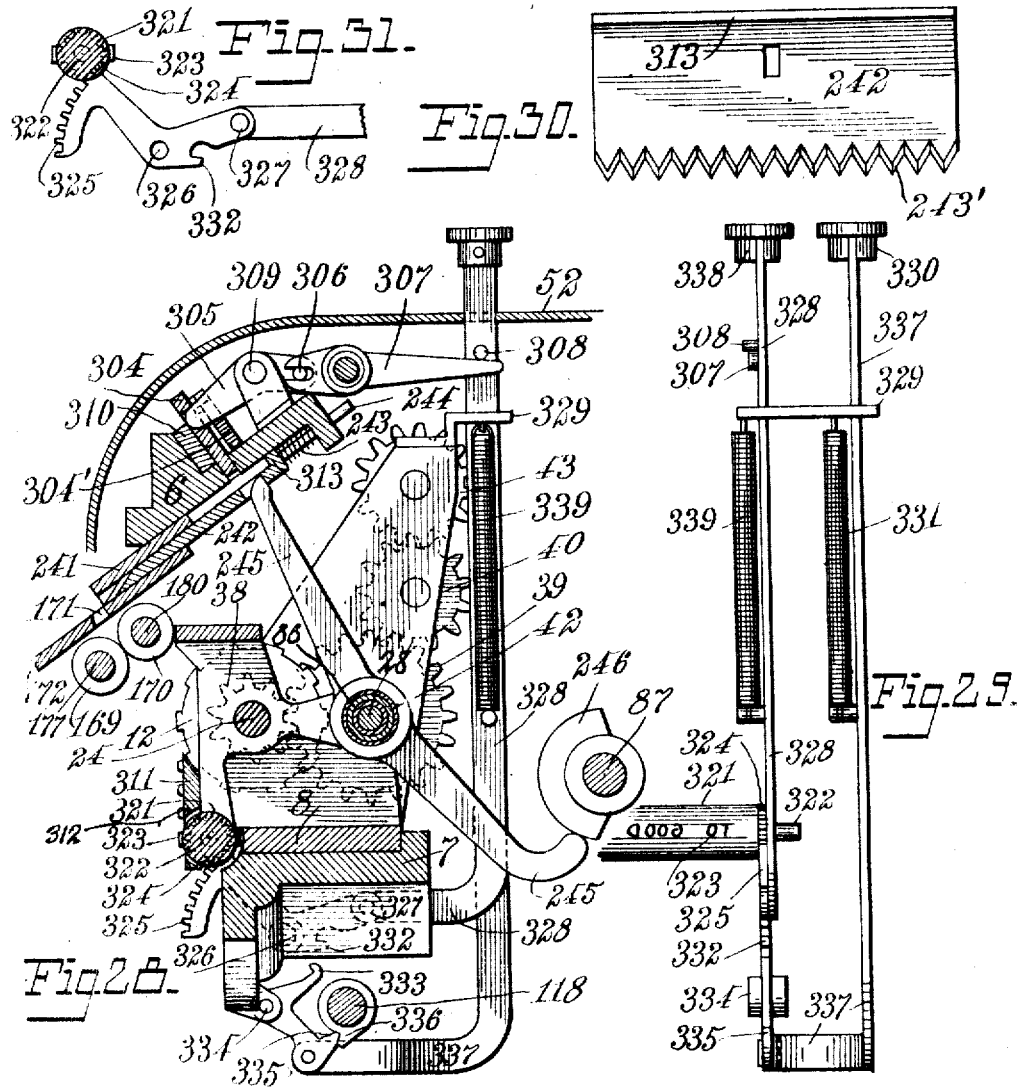

J. F. OHMER.
TICKET ISSUING AND AUDITING MACHINE.
APPLICATION FILED MAR. 23, 1916.
1,274,192.
Patented July 30, 1918.
15 SHEETS—SHEET 15.
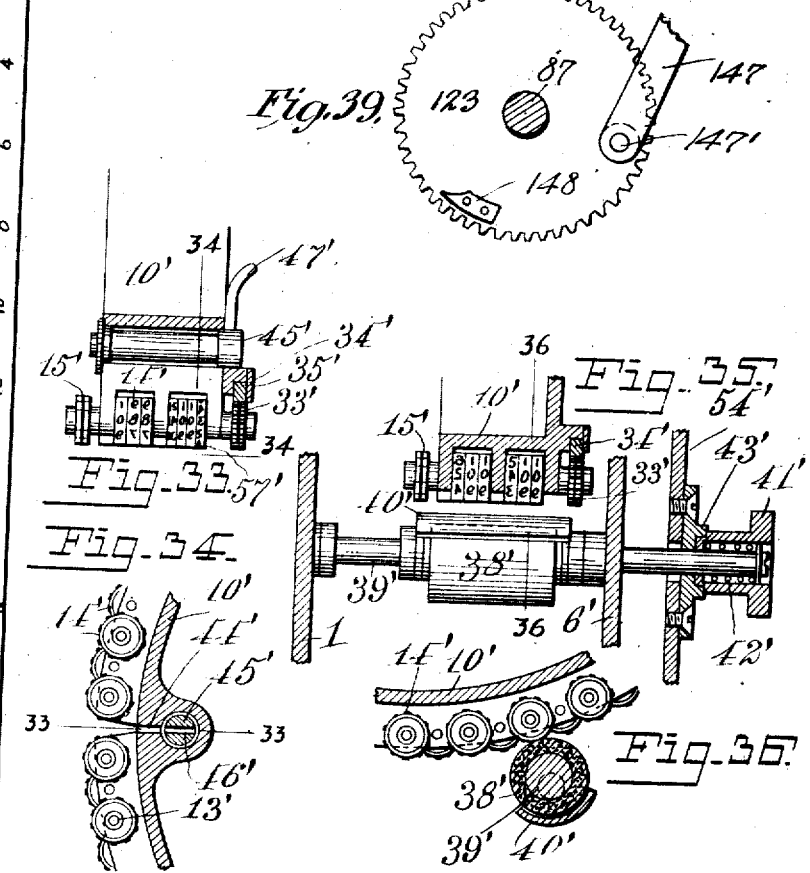
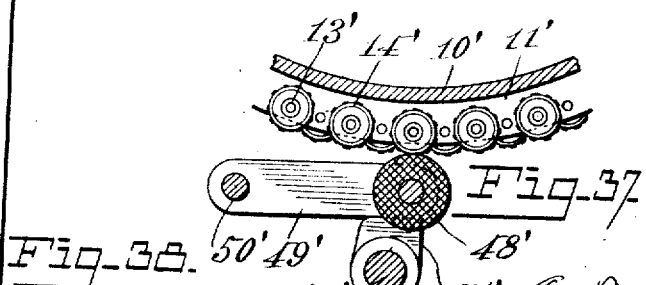
Witness
W. Liebler
M. Galloway
Inventor
Jno. F. Ohmer.
By R. J. McCarty
his Attorney

UNITED STATES PATENT OFFICE.

JOHN F. OHMER, OF DAYTON, OHIO.

TICKET ISSUING AND AUDITING MACHINE.

1,274,192. Specification of Letters Patent. Patented July 30, 1918.

Application filed March 23, 1916. Serial No. 86,192.

*To all whom it may concern:*

Be it known that I, JOHN F. OHMER, a citizen of the United States, residing at Dayton, in the county of Montgomery and State of Ohio, have invented certain new and useful Improvements in Ticket Issuing and Auditing Machines; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to new and useful improvements in ticket issuing and auditing machines and is, an improvement over the mechanism shown and described in my co-pending application Serial No. 870,468, filed November 5, 1914. The objects of the present invention are several, principally among which are: to provide means whereby the machine is locked when the setting means for each class of ticket is in a normal position; and further, to provide means for returning the price and class setting means to a normal position; and further, to provide means for automatically printing and issuing a round trip ticket; and further, to provide means for severing or partially severing the tickets; and further, to provide means for counting and furnishing a printed record from time to time of the number of tickets issued to any one station. To the above ends the mechanism is simple in construction and efficient in operation as will appear in the following detail description in connection with the accompanying drawings.

Referring to the accompanying drawings, Figure 1, (Sheet 1) is a front elevation of the left end of the machine;

Fig. 1ª, (Sheet 2) is a front sectional elevation slightly enlarged of the right end of the machine;

Fig. 2, (Sheet 3) is a top plan view of the left end of the machine;

Fig. 2ª (Sheet 4) is a section on the line 2ª—2ª of Fig. 1ª;

Fig. 3 (Sheet 5) is a section on the line 3—3 of Fig. 2;

Fig. 3ª (Sheet 6) is a section on the line 3ª—3ª of Fig. 1ª;

Fig. 4 (Sheet 7) is an end elevation of the left end of the machine;

Fig. 5 (Sheet 8) is a section on the line 5—5 of Figs. 1 and 2;

Fig. 6 (Sheet 8) is a detail view of the means for locking the machine when the class lever is in a normal position;

Fig. 7 (Sheet 9) is a detail view of the total cash counter mechanism similar to portions in Fig. 5 with the parts in a different position;

Fig. 8 (Sheet 9) is a front elevation of the setting mechanism for the total cash counter;

Fig. 9 (Sheet 9) is a detail view of the actuating lever of the transfer mechanism of the total cash counter;

Fig. 10 (Sheet 10) is a detail view of the transfer mechanism of the total cash counter;

Fig. 11 (Sheet 10) is a side elevation of the station printing drum;

Fig. 13 (Sheet 10) is a perspective view of one of the station printing type;

Fig. 14 (Sheet 10) is a detail view of the platen actuating elements of the printing mechanism;

Fig. 15 (Sheet 10) is a detail view of the means for pressing the platen against the printing type;

Fig. 16 (Sheet 11) is a section approximately on the line 16—16 of Fig. 2; the same being a detail view of the means for actuating the consecutive counter, the means for setting the detail printing device, and the means for sounding an audible indication;

Fig. 17 (Sheet 11) is a detail view of one of the setting bars for the total cash counter;

Fig. 18 (Sheet 11) is a detail sectional view of the frictional devices for driving the roll of the printed record;

Figs. 19, 20 and 21 (Sheet 7) are detail views of the identification printing devices;

Figure 12:
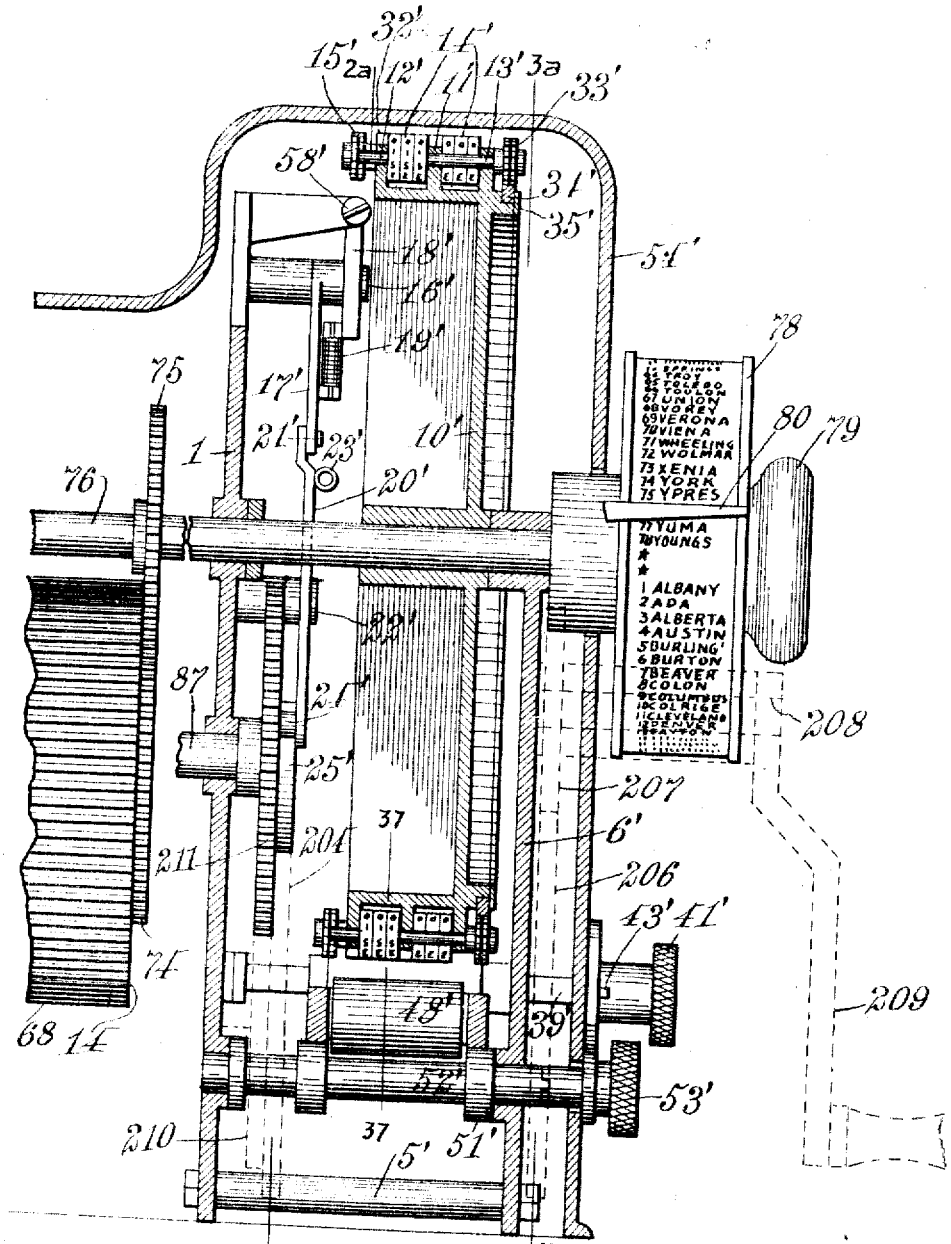
Fig. 12 (Sheet 10) is a perspective view of one end of the bars which supports the station printing type in the drum.
Figure 3:
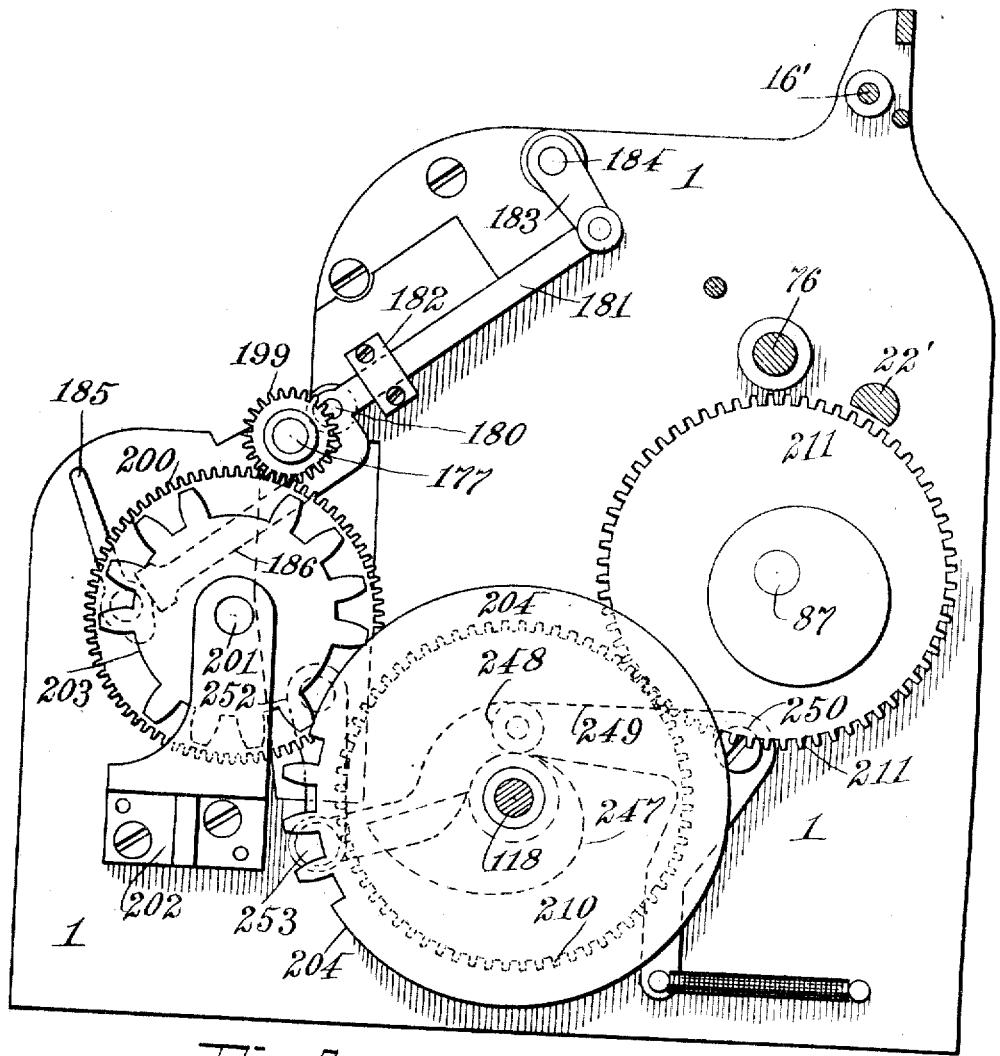

Fig. 22, (Sheet 12) is a detail sectional view showing the arrangement of the printing wheels, the date of the station printing means;

Fig. 23, (Sheet 12) is a detail view of the variated stop for the total cash counter;

Fig. 24 (Sheet 12) is a detail view of the type-wheel-alining means;

Fig. 25 (Sheet 6) is a plan view of the counters for recording the number of tickets issued to any one station;

Fig. 25ª (Sheet 6) is a detail view of the means for resetting the station counters to zero;

Fig. 26 (Sheet 13) is a view of the printed record for the passenger tickets;

Fig. 27 (Sheet 13) is a view of a one-way passenger ticket;

Fig. 28 (Sheet 14) is a section approximately on the line 28—28 of Fig. 1 and is a detail of the ticket severing means and the means for issuing a round trip ticket;

Fig. 29 (Sheet 14) is a detail view of the means for issuing a round trip ticket, being a side elevation of portions shown in Fig. 28;

Fig. 30 (Sheet 14) is a detail view of the severing knife;

Fig. 31 (Sheet 14) is a detail view of the shiftable type means for the round trip ticket printing means;

Fig. 32 (Sheet 14) is a view showing a round trip ticket as issued from the machine;

Fig. 33 (Sheet 15) is a section on the line 33—33 of Fig. 3ª;

Fig. 34 (Sheet 15) is a section on the line 34—34 of Fig. 33;

Fig. 35 (Sheet 15) is a section on the line 35—35 of Fig. 3ª;

Fig. 36 (Sheet 15) is a section on the line 36—36 of Fig. 35;

Fig. 37 (Sheet 15) is a section on the line 37—37 of Fig. 1ª; and Fig. 38 (Sheet 15) is a view of the record showing the number of tickets issued to each station.

Fig. 39 is a detail view of cam 148.

Throughout the specification and drawings, similar reference characters indicate corresponding parts both in the description and drawings.

*The main frame work.*

The frame work of the machine may be of any suitable design. It is here shown to consist of an intermediate side plate 1, a left side plate 2 and a right side plate 6'. The plates 1 and 2 are connected by cross members 3, 4, 5, 6 and 7, as will be seen from Fig. 5, while the plate 6' is connected to the plate 1 by members 5' shown in Fig. 1ª.

*Printing type wheels*, (Figs. 1, 5 and 22; Sheets 1, 8 and 12.)

Mounted in the cross member 7 is a frame 8 in which is mounted a plurality of type wheels as follows:—At the right end of the frame are type wheels 9 and 10 for printing the date upon the ticket. To the left of the type wheel 10 is a series of type wheels 11 for printing the consecutive number on the tickets. To the left of the wheels 11 is a type wheel 12 for printing the class of fare on the tickets. To the left of the type wheel 12 are type wheels 13 for printing the specific fare on the tickets. To the left of the type wheels 13 is a station printing drum 14 which will be hereinafter more fully described and which is instrumental in printing the stations on both the tickets and records. To the left of the station printing drum 14 are type wheels 15 for printing the specific fare on the records. To the left of the wheels 15 is a wheel 16 for printing the class of fare on the record. To the left of the wheel 16 is a series of type wheels 17 for printing a consecutive number on the record. To the left of the type wheel 17 are a series of type wheels 18 and 19 for printing the total amount of cash on the record. To the left of the type wheels 19 are type wheels 20 for printing the minutes of the time at which the tickets were issued on the record. To the left of the wheels 20 is a wheel 21 for printing the hours at which the tickets were issued on the record. To the left of the wheel 21 is a wheel 22 for printing the month of the year on the record. And to the left of the wheel 22 is a wheel 23 for printing the day of the month on the record. The type wheels to the right of the station printing drum 14 are mounted on a shaft 24, while the type wheels to the left of the station printing drums are mounted on a shaft 25. The station printing drum 14 is mounted on a hollow shaft 26 supported in the frame 8 as are the shafts 24 and 25. The manner of mounting these various printing wheels and devices will appear from the description to follow.

*Setting means for the manually setting devices*, (Fig. 24, Sheet 12.)

As will be seen, the date printing wheels 9 and 10 are connected in a well known manner by gears 27 to telescopic shafts 28 and 29. The shafts 28 and 29 are journaled in the frame 8, extend the length thereof, and are connected in a well known manner by gears 30 to the date printing wheels 22 and 23. The date printing wheels 9, 10, 22 and 23 are set to printing positions by drums 31 and 32, shown also in Fig. 2. The drums 31 and 32 are mounted on the two outer telescopic shafts 33 which are connected in a well known manner by means of gears 34 to the gears 30. The drums 31 and 32 are also provided with suitable connections to permit the type wheels 9, 10, 22 and 23 to be set. The time printing wheels 20 and 21 are connected in a well known manner by idler gears 35 and gears 36 to inner telescopic shafts 33 upon which indicating drums 37 are mounted and by means of which the time printing devices are set. The specific fare printing devices 13 and 15 are set through the agency of the following train of gearing; see Figs. 2 and 16, Sheets 3 and 11.

The printing devices 13 for the tickets are provided with gears 38 which mesh with idler gears 39 mounted on the same axis with the shaft 28. The gears 39 mesh with idler gears 40 on shaft 40' which in turn mesh with gears 41 mounted on telescopic shafts 42 journaled in the frame 8. The telescopic shafts 42 are provided with gears 43 which mesh with gears 44 mounted on telescopic shafts 45 journaled in a frame member 46 supported by the cross members 5 and 6. Also mounted on the telescopic shafts 45 are gears 47 which mesh with segment gears 48 journaled on a shaft 49 mounted in the frame member 46. Extending from the segment gears 48 are oscillating levers 50 which extend out through slots 51 in a casing 52. When the levers 50 are rocked, the fare printing devices 13 and 15 are concurrently rocked to printing position and the said printing devices 13 and 15 are shown by suitable indications 53 on the casing 52, as will be seen from Fig. 8, Sheet 9. The levers 50 will be again referred to under the heading "Total cash counter." The type wheels 15 are set in a manner similar to the type wheels 13 through the agency of a train of gearing consisting of gears 54, 55, 56 on shaft 56″ and 57 mounted on telescopic shafts 58 and provided with gears 59 which mesh with the gears 44. The fare class printing devices 12 and 16 for the tickets and records are provided with gears 60 mounted on a telescopic shaft 61, and are set from a lever 62 similar to the levers 50 through a train of gearing which consists of a segment gear 63, a gear 64 in alinement with the gears 47, the outer one of the telescopic shafts 45, a gear 65 in alinement with the gears 44, and a train of gearing identical to and in alinement with the gears 59, 57 and 56.

*Station printing devices*, (Figs. 11, 12, 13 and 22; Sheets 10 and 12.)

The station printing drum 14 which, as before stated, is mounted on the hollow shaft 26 and is provided with a plurality of radial slots 66. Mounted in the slots 66 are a corresponding number of bars 67 upon which station printing types 68 are placed. The bars 67 are provided with suitable recesses which receive ribs 70 of the type 68 thereby holding said types in position. Each bar 67 is provided with duplicate station printing type 68 which are spaced apart by members 71 mounted on the bars 67. One of the station printing type on each bar is adapted to print on the record, while the other station printing type is adapted to print on the ticket. It is contemplated that the station printing drum shall contain a large number of printing type so that the machine shall be of great capacity with reference to the number of stations for which tickets may be printed and issued. The station printing types are, therefore, mounted closely together and, in order to prevent more than one station printing type printing on the ticket and record, the selected type is pushed outwardly during the process of printing by the following means; see particularly Fig. 11, Sheet 10.

Mounted on the hollow shaft 26 is a hub 72 provided with a cam projection 73 held in position by the end of the shaft 25. The cam projection 73 is adapted to engage the type bar of the selected station printing type to move and to hold the face thereof beyond the face of the non-selected type and thus permit only the selected type to be inked and subsequently to print on the ticket and record. The selected type not being held in an outer position will recede if in an extended position when engaged by the ink roll or plate (see Figs. 11 and 22). The station printing type are selected for printing by the following means:

Attached to the drum 14 is a gear 74 in mesh with a gear 75 mounted on a shaft 76 journaled in a bracket 77 and in the frame member 1. On its outer end the shaft 76 is provided with a station indicating drum 78, shown also in Fig. 1ᵃ. The said drum 78 is provided with a knob 79 by means of which the indicating drum 78 and the station printing drum 14 may be concurrently rotated. The indicating drum 78 is provided with characters which may be read from an indicating arm 80 whose position on the face of said drum corresponds in sequence to the position of the selected station printing type on the drum 14. Whenever the name of a selected station on said drum 78 is brought in alinement with the arm 80, the corresponding type 68 of the drum 14 are in a printed position. The type 68 are held in a printing position by a pawl 81, the end of which is adapted to engage the teeth of the gear 74. The pawl 81 is mounted on the telescopic shafts 42 and is provided with a spring 82. The bars 67 are held within the slots 66 by rings 83 adapted to engage shoulders 84 of said bars.

*Consecutive numbering counters*, (Figs. 16 and 22; Sheets 11 and 12.)

The consecutive counting wheels 11 and 17 for the tickets and records are provided with the usual one-tooth transfer wheels 85 and these counters are actuated concurrently through the agency of a telescopic shaft 86 which connects the primary transfer gears of the counters. The said counters are actuated from a main actuating shaft 87 through the agency of Swiss gears 88 and 89, the latter one of which is connected to a gear 90 which meshes with a gear 91 attached to the unit type wheel of the ticket consecutive number printing counter 11. Whenever the main actuating shaft 87 makes one complete revolution, the unit type wheels of both the counters 11 and 17 are actuated to the extent of one digit.

*Identification printing means*, (Figs. 2, 19, 20 and 21; Sheets 3 and 7.)

The means for printing the identification of the operator upon the record consists of a printing key 92 which is adapted to be inserted in the casing 93 mounted on the side plate 2. The said key 92 is provided with type 94 adapted to print on the record. In Fig. 26, Sheet 13, I have shown the key as adapted to print in column A of the record the identification of the operator.

*Total cash counters*, (Figs. 5, 7, 8, 9, 10, 17 and 22.)

The amount of fare or value of transportation as selected by the levers 50 is added to the type wheels 18 by the following means: Each of the type wheels 18 is provided with a pinion 95 which meshes with gears 96 mounted on a shaft 97 journaled in the frame 8. The gears 96 are adapted to be engaged by variably movable segment gears 98 pivoted on a sliding shaft 91$^a$ mounted in a bracket 100. The segment gears 98 are moved in and out of mesh with the gears 96 by levers 101 pivoted on the shaft 87. The upper ends of the levers 101 engage the pivoted shaft 91$^a$ to shift the segment gears 98. The levers 101 are controlled by springs 102 attached to the cross frame 7 an dcams 103 mounted on a sleeve 104 on the shaft 118. The means for rotating the cams 103 will be hereinafter described. The segment gears 98 tend normally, when released, to move downwardly under the influence of gravity assisted by springs 105. The segment gears 98 are variably set by the following means:

Attached to each of the levers 50 is a segment 106 provided with variable steps 107, corresponding in number to the digits 1 to 9 inclusive and their positions from the pivot 49 of the levers 50 correspond to the value of the various digits. The said steps 107 are adapted to be engaged by projections 108 on a vertically slidable bar 108$^a$ provided with an upper portion 109 and a lower portion 110, see Fig. 5 (Sheet 8). The said vertical moving bars so provided with the portions 109 and 110 are each supported and guided by the shaft 49 and a lower shaft 111 carried by a frame 112. The upper portions 109 of said bars are provided with steps 113 upon which the segment gears 98 normally rest. The said bars 108$^a$ are held normally in the upper position and are released to permit them each to fall by gravity by cams 114, one for each of said bars, it being understood that there is a vertical moving bar 108$^a$ for each type wheel 18. The cams 114 are mounted on the sleeve 104 and are adapted to be engaged by levers 115 pivoted at 116 and provided with bifurcated ends which receive studs or rollers 117 on the lower ends of the lower portions 110 of the said vertically moving bars. When the levers 50 have been set and the cams 103 have been rotated to permit the segment gears 98 to unmesh with the gears 96 the said vertically moving bars 108$^a$ will drop by gravity until the projections 108 engage the steps 107. When the said vertically moving bars descend, their segment gears 98 will also descend to a corresponding value depending upon the position of the various levers 50. When the segment gears 98 and the gears 96 are subsequently meshed by the cams 103 and the vertically moving bars 108$^a$ are subsequently elevated, the cams 114 will rock the levers 115 and elevate the said vertically moving bars to a normal position thereby rotating each of the wheels 18 of the total cash counter a distance proportionate to the distance the levers 50 were subsequently set. The cams 103 and 114 are, as before stated, mounted on the sleeve 104 which is journaled on the shaft 118. The sleeve 104 is provided with a Swiss gear 119 adapted to mesh with an intermittent gear 120 pivoted on a stud 121 to the side plate 2. The intermittent gear 120 is provided with a continuous gear 122 which meshes with a gear 123 on the main operating shaft 87. The transfer mechanism of the type wheels 19 of the total cash counter is of any well known type, while the transfer means for type wheels 18 is as follows:

Each of the units, tens and hundreds wheels 18 is provided with a cam 124 each of which is adapted to engage projections 125 of individual levers 126, (see Figs. 5, 7 and 10, Sheets 8, 9 and 10). The levers 126 are moved to and held in a normal position by springs 127 (see Fig. 5) but are held in a set position by a latch 128 pivoted at 129 and controlled by a spring 130. The levers 126 are pivoted at 131 and are provided with arms 132 adapted to engage the shoulders 133 on the respective latches 128. The latches 128 are provided with projections 134 adapted to be engaged by individual cams 135 mounted on the shaft 87. The cams 135 actuate the latches 128 to permit the springs 127 to return the levers 126 to a normal position. The levers 126 are actuated by the cams 124 whenever the zero mark of a respective type wheel reaches the printing position. The said levers 126 are provided with shoulders 136 adapted to be engaged by the ends 137 of levers 138 whenever the said levers 126 are shifted by the cams 124. The levers 138 are carried by the lower portions 110 of the vertically moving bars 108$^a$. The ends 139 of the levers 138 opposite the ends 137 are adapted to engage their respective segment gears 98 to impart to said segment gears the movement sufficient to actuate the next succeeding higher digit wheel to the extent of one digit whenever a vertically moving bar 108ª moves upwardly and the end 137 engages the shoulder 136 of a lever 126. The portions 109, 110, are slidingly connected by means of pins 140, while the relative movement between the upper and lower members is sufficient to add one digit on its respective wheel 18. The purpose of providing the relative movement between said upper and lower members 109 and 110 is to permit the transfer mechanism to be actuated whenever any one of the levers 50 remains set at the zero point and the respective upper portion 109 remains stationary. It is to be understood that any one transfer mechanism is set by a type wheel 18 of a lower digit and that such type wheel actuates the type wheel of the next succeeding higher digit. After the cams 114 have elevated either the lower portions 110 or the complete vertically moving bars 108ª, the cams 135 engage the projections 134 of the levers 138 to release the levers 126 to permit the parts to return to a normal position. The levers 50 are locked in a normal position, or the position shown in Fig. 5, by pawls 141 which normally engage the ratchets 142. The said pawls are disengaged from the ratchets by finger pieces 144 which are connected to the pawls by levers 145 and rods 143. After the pawls 141 have been released from engagement with the ratchets 142, the levers 50 may be moved indiscriminately to the various setting positions. The levers 50 are held in their various set positions by the alining devices of the price-printing or ticket-value wheels which are not shown as they may be of any well known type. The levers 50 are returned to their normal position after the issuance of a ticket by rotating the shaft 49 and ratchets 142 one-fourth of a revolution which operation picks up the pawls 141 and moves them to the position shown in Fig. 5. When the levers 50 are returned to the normal position, the segments 106 and the price printing type wheels are simultaneously returned to normal. The shaft 49 is given the quarter revolution above referred to as follows; Figs. 2, 8 and 16, Sheets 3, 9 and 11:

Slidingly mounted on the shaft 49 is a clutch member 149 adapted to be clutched with a gear 150 freely mounted on the shaft 49. The gear 150 meshes with a gear 151 attached to a Swiss gear 152. The gears 151 and 152 are journaled on a bracket 153 extending from the cross member 5. The Swiss gear 152 is in mesh with an intermittent gear 154 mounted on the shaft 87. When the shaft 87 is rotated, the gear 150, the clutch member 149, shaft 49, and ratchets 142, will be moved one-fourth of a revolution. Whenever it is desired to print zero in the fare indication, the lever 50 for that digit will remain in its normal position in which case the respective pawl 141 will be in engagement with the ratchet which would prevent the shaft 49 rotating. To disengage said pawls from the ratchet, under these conditions, the said pawls are elevated by the means shown in Figs. 3 and 5. Journaled in suitable bearings on the cross member 5 is a pivot or shaft 146' provided with fingers 146 adapted to engage and elevate the pawls 141. The fingers 146 are held in the normal position shown in Fig. 5 by a spring 148' (see Fig. 2). The shaft 146' is provided with an arm 147 having a pin 147' adapted to be engaged by a cam 148 on the gear 123. The position of the cam on the gear is such that the pawls 141 will be elevated simultaneously with the initial resetting movement of the shaft 49 thereby releasing the ratchets 142. The levers 62 of the class printing devices is also provided with a ratchet 142 and pawl 141 identical with the ratchet and pawl of the price printing devices. In Fig. 2, I have shown the gear 150 as disengaged from the clutch member 149 but it will be understood that these parts are normally in engagement, the clutch member being provided to permit duplicate tickets to be issued without resetting the levers 50 as follows; see Fig. 2:

The clutch member 149 is actuated by a bell-crank lever 155 pivoted at 156 and connected to a push-rod 157 provided with a thumb-button 158 accessible from the front of the machine. The push-rod 157 is provided with a spring 159 which normally holds the clutch member 149 and gear 150 in engagement. By pushing on the thumb-button 158, the clutch member 149 and gear 150 are disconnected which operation prevents rotation of the shaft 49, the levers 50 of the price printing devices being reset to a normal position after the subsequent issuing of the ticket. The type wheels 18 of the total cash counter are prevented from moving rearwardly by spring-controlled pawls 160 which engage the teeth of the gears 96. The various type wheels may be provided with any well known form of alining devices, not shown.

*Paper feeding mechanism*, (Figs. 1, 2, 3, 4 and 5.)

The paper from which the tickets are printed is unwound from a roll 161 mounted in a swinging frame 162 pivoted on a rod 163. The paper from which the record is printed is unwound from a roll 164 mounted in a swinging frame 165 pivoted on a rod 166. The rolls 161 and 164 are provided with tension devices 167. The paper from the ticket roll 161 passes between roller platens 168 and the type wheels of the ticket bank and thence upwardly between feeding rollers 169 and 170 and thence outwardly through an opening 171 in a plate 172 of the ticket-severing means. The platen 168 (Fig. 1) is similar in construction to platen 173 (Fig. 5). The paper strip for the record roll 164 passes upwardly between roller platens 173 and the type wheels of the record bank and thence upwardly between feeding rollers 174 and 175 and thence downwardly and around a spool 176, shown in Fig. 5. The rollers 169 of the ticket strip are the feeding rollers and are mounted on a shaft 177 journaled in the plate 1 and an intermittent plate 178; Fig. 2. The rollers 174 of the record strip are the feeding rollers and are mounted on a shaft 179 journaled in the division plate 178 and side plate 2. The rollers 170 of the ticket strip are tension rollers and are mounted on the shaft 180 journaled in the lower end of sliding bars 181, the bars 181 being mounted in suitable guides 182 in the division plate 178 and side plate 1, see Fig. 3. The upper ends of the bars 181 are connected to cranks 183 mounted on a shaft 184 journaled in the side plate 1 and division plate 178. The shaft 184 is rocked to separate the rollers 169 and 170 by a cam lever 185, shown in Fig. 3. The cam lever 185 is adapted to engage the lower end of a projection 186 extending from one of the sliding bars 181. The shaft 184 is provided with a crank 187 which in turn is provided with a spring 188 which is instrumental in pressing the feed rollers 169 and 170 together. When the cam lever 185 is rocked, the rollers 169 and 170 are separated against the tension of the spring 188 thereby permitting the ticket strip to be inserted between the feed rollers. The rollers 175 of the record strip are the pressure rollers and the same are mounted upon a shaft 189 journaled in sliding bars 190 connected to cranks 191 mounted on a shaft 192 journaled in the side plate 2, the frame 46, and the division plate 178. The shaft 192 is provided with a crank 193 having a spring 194 which is instrumental in pressing the feed rollers 174 and 175 together. The said feed rollers 174 and 175 are separated to permit of the insertion of the record strip by a bar 195 one end of which is connected to one of the cranks 191 and the other end of which is provided with a cam slot 196, shown in Fig. 4. The cam slot 196 receives one end of a pin 197 extending from the side plate 2. The lower end of the bar 195 is provided with a finger member 198 which permits the lower end of the bar 195 to be moved upwardly, see Fig. 1. When the lower end of the bar 195 is moved upwardly, the cam slot 196 rocks the shaft 192 thereby separating the feed rollers 174 and 175 against the tension of the spring 194. The feed rollers for the tickets are actuated as follows, see Figs. 1 and 3: The outer end of the shaft 177 is provided with a pinion 199 in mesh with a gear 200 mounted on a stud 201 extending from the bracket 202 mounted on the side plate 1. Attached to the gear 200 is a Swiss gear 203 in mesh with an intermittent gear 204 mounted on the shaft 118 journaled in the side plates 1 and 2. Also mounted on the shaft 118 and attached to the intermittent gear 204 is a gear 206 in mesh with a pinion 207 mounted on a stud 208 extending from the side plate 1. Attached to the gear 207 is a crank 209 by means of which the machine is operated when it is desired to issue a ticket. Also mounted on the shaft 118 is a gear 210 in mesh with a gear 211 mounted on the main actuating shaft 87 of the total cash counter, before referred to. Whenever the crank 209 is rotated, the said main actuating shaft 87 of the total cash counter is also rotated as is also the intermittently rotating shaft 177 of the ticket paper-feeding means. The shaft 179 of the record paper-feeding means is actuated from the shaft 118 as follows, see particularly Fig. 4.

The outer end of the shaft 179 is provided with a Swiss gear 212 in mesh with an intermittent gear 213 mounted on a stud 214 extending from a bracket 215 attached to the side plate 2. Attached to the said intermittent gear 213 is a Swiss gear 216 in mesh with an intermittent gear 217 mounted on the shaft 118. The arrangement of the gears for the paper-feeding mechanism is such that the ticket strip will be fed forward at each operation a distance equal to the length of a ticket, as seen from Fig. 27, while the record strip will be fed forward a distance equal to one of the horizontal spaces as seen from Fig. 26. The record strip, after passing through the feed rollers 174 and 175, is wound around the spool 176, as before stated. One end of the spool 176 is supported by a disk 218 mounted on a stud 219 journaled in a boss 220. The stud 219 is provided with a cam 221 provided with a handle 222. When the handle 222 is rocked, the disk 218 is moved longitudinally to the spool thereby permitting the spool to be extracted. The opposite end of the spool is mounted on a stud 223 which extends from the rotating member 224 mounted in a boss 225 on the side plate 2. The rotating member 224 is provided with a pin 226 which is received by a suitable opening in the spool and by means of which the spool is rotated, see also Fig. 18, Sheet 11. The rotating member 224 is driven from the intermittent gear 213 through gears 227 and 228 and a friction device as follows: The gear 228 is provided with a hub 229 which lies within the rotating member 224. The rotating member 224 is provided with openings 230 in which are mounted friction members 231 which press against the hub 229 of the gear 228. The frictional contact between the devices 231 and hub 229 is controlled by springs 232 the tension of which is adjusted by screws 233. By this arrangement the gear 228 is given a greater amount of movement than is necessary to wind up the paper on the spool 176 as fed by the rollers 175 and 171 which serves to compensate for the increased diameter of the roll of paper on the spool. To prevent the crank 209 being rotated in an improper direction, the shaft 118 is provided with a ratchet 234 in operative relation with a spring-controlled pawl 235 on the side plate 2. This ratchet, in preventing the crank 209 being turned rearwardly, also prevents the consecutive number counters being moved backward. To indicate to the operator when the crank 209 has been rotated to an extent sufficient to issue a ticket, the shaft 118 is provided with a disk 237 having a recess 239 therein. The recess 239 is adapted to receive one end of a spring-controlled pawl 240 pivoted at 236. When the shaft 118 makes one complete revolution in issuing each ticket, the pawl 240 snaps into the recess 239 and the resistance offered by the pawl 240 to the further movement of the crank 209 indicates to the operator that a complete operation has been performed.

*Platen mechanism,* (Figs. 3, 4, 5, 14 and 15; Sheets 5, 7, 8 and 10.)

Mounted on the ends of the shaft 118 and lying next to the plates 1 and 2 are cams 247 which are adapted to engage rollers 248 mounted on levers 249 pivoted at 250 to the side plates 1 and 2. The levers 249 are under the control of the cams 247 and springs 251. The ends of the levers 249 opposite the pivots 250 are provided with side plates 252 pivoted thereto at 253. Mounted in the side plates 252 is a shaft 254 upon which the roller platens 168 and 173 are mounted. The said platens are moved upwardly over the face of the printing devices of the cams 247 and levers 249. During their upward movement, the roller platens are pressed against the printing devices by levers 255 pivoted at 256 to the side plates 1 and 2 and intermediate plate 178. The levers 255 are provided with faces 256ᵃ which engage the ends of the shaft 254. The levers 255 are actuated to press the roller platens against the type by springs 257 which are connected to pins 258 carried by the levers 255, and to levers 259 also pivoted at 256. The free ends of the levers 259 are adapted to engage cams 260 on the shaft 118. The position of the cams 260 are such that when the roller platens are moving upwardly the tension of the springs 257 will be exerted on the levers 255 thereby pressing the roller platens against the type. The object of providing a flexible connection between the cams 260 and the levers 255 is to compensate for any unequal movement of the roller platens when moving over the type. The type are inked previous to the passage of the roller platens thereover by felt inking rollers 261 mounted on levers 262 journaled on the shaft 254 and controlled by springs 263. To prevent the paper strips becoming soiled by the inking rollers 261, a shield 264 is mounted between said inking rollers and the roller platens and under which the paper strips pass. When in normal position, the inking rollers 261 lie against an ink fountain consisting of a trough 265 supported by the cross member 7. The trough 265 is preferably filled with felt or wick which is instrumental in providing a reservoir for and supplying additional ink to said inking rollers 261. The roller platens 168 and 173 are rolled over the type through the agency of gears 266 mounted on the outer ends of the roller platens. The gears 266 mesh with idlers 267 supported by brackets 268 extending from the side plates 252. The idlers 267 are adapted to mesh with racks 269 carried by the levers 255 during the time the roller platens are moving over the face of the type.

*Means for locking the machine at each operation,* (Figs. 3, 4, 19, 20 and 21.)

The machine is locked against operation except only when both the date of the year or identification key are in position, as follows: The left end of the shaft 118 is provided with a disk 270 provided with a recess 271 which receives the lower end of a locking lever 272 pivoted at 273 to the side plate 2. When the lower end of the lever 272 lies within the recess 271, the shaft 118 cannot be rotated and the machine is consequently, locked. The lower ends of the lever 272 are extracted from the recess 271 by the key 92 as follows: The key 92 is provided with a projection 274 adapted to engage the end 275 of lever 276 pivoted at 277. The lever 276 is provided with a downwardly extending bifurcated portion 278 which receives the end of projections 279 which extend from the lever 272. When the key 92 is inserted in the housing 93, the projection 274 rocks the levers 276 and 272 thereby moving the lower end of the lever 272 out of the recess 271. When the key 92 is withdrawn from the housing 93, projections 280 on said key rock the lever 276 in a direction to move the lower end of the lever 272 into the recess 271 thereby locking the machine. When the key 92 is out of the housing, the lever 272 will lock against accidental displacement by a pin 281 which extends down through the housing 93 and is in a position to engage the lever 276 to lock the same. The pin 281 is carried by the plate 282 and is moved upwardly out of the path of the levers 276, when the key is inserted, by a pin 283 on plate 282 which is engaged by a cam surface 284 on the key 92. The plate 282 is slidingly mounted on stud 285 extending from the key housing 93 and is controlled by a spring 286 which surrounds the stud 285. The machine is also locked against operation when the class selecting lever 62 is in a normal position by the following means, see Figs. 2 and 6, Sheets 3 and 8: Mounted on the main actuating shaft 87 is a one-tooth ratchet 319 in operative relation with a hook 320 on a pawl lever 316 pivoted at 317 and partially controlled by a spring 318. The upper end of the lever 316 is provided with a pin 315 adapted to be engaged by a cam 314 on the segment gear 48 of the "class" setting lever 50. When the class setting lever 62 is moved from a normal position, the cam 314 actuates the lever 316 to release the main actuating shaft 87 thereby unlocking the machine. This mechanism compels the class of ticket to be selected before the machine may be operated.

*Bell ringing mechanism,* (Fig. 16.)

At the end of each ticket issuing operation an audible signal is given as follows: Mounted upon the cross members 3 and 4 is a frame 287 which supports a bell 288 adapted to be engaged by a clapper 289 carried by a lever 290 pivoted at 291 and under the control of a spring 292 and cam 293 mounted on the shaft 118. The cam 293 engages a projection 294 on lever 290 and whenever the cam 293 is rotated, the lever 290 is depressed. When the cam 293 rides off the projection 294, the lever 290 will snap upwardly under the tension of the spring 292. The upward movement of the lever 290 is arrested by a pin 295. When the movement of the lever 290 is thus arrested, the bell-clapper 289 will engage and sound the bell 288 in a well known manner.

*Type wheel alining devices,* (Figs. 5 and 24.)

To aline the type wheels accurately during the process of printing, each type wheel is provided with a lever 296 the outer or free end of which is adapted to lie in between the teeth of the various actuated gears attached directly to the type wheels. The levers 296 are mounted upon shafts 297, there being a shaft 297 for the ticket bank and a shaft 297 for the record bank. The shafts 297 are journaled in the frame 8 and on their ends adjacent to the side plates 1 and 2 they are provided with cranks 298 having pins 299 thereon. The levers 296 are pressed upwardly by springs 300 one end of each of which is attached to pins 299 and the other ends of which are attached to levers 301 pivoted on the ends of the shafts 297 the free ends of which are adapted to engage cams 302 mounted on the main actuating shaft 87. The free ends of the levers 301 are held in operative relation with the cams 302 by springs 303. When, during the operation of printing a record and a ticket, the platen rollers roll on the type wheels, the cams 302 are in a position to depress the levers 301 thereby tensioning the springs 300 and moving the levers 296 upwardly thereby alining the various type wheels. The purpose of providing a flexible connection between the levers 296 and the cams 302 is to compensate for any unequalities of manufacture in the cams.

*Paper severing means,* (Figs. 1, 2, 28 and 30.)

As before stated, the strip of paper for the tickets issues out of an opening 171 in a plate 172. The plate 172 is attached to a plate 241 supported by the cross member 6. Mounted in the plate 241, as will be particularly seen from Fig. 28, is a shearing knife 242 provided with serrations 243' which cooperates with an edge of the opening 171 in shearing the tickets. The shearing knife 242 is actuated to shear the paper by springs 243 which surround pins 244 extending therefrom. The said shearing knife 242 is actuated against the tension of the springs 243 by a lever 245 pivoted on the telescopic shaft 86 and adapted to be actuated by a cam 246 mounted on the main actuating shaft 87. After the tickets and records thereof have been printed and fed, the cam 246 releases the lever 245 and permits the spring 243 to actuate the knife to sever the tickets. The serrations 243' of the knife permit the ticket to be partially severed when it is desired to issue a round trip ticket which is issued by the following means.

*Means for issuing a round trip ticket,* (Figs. 1 and 2, and views shown on Sheet 14.)

Mounted on the frame 8, adjacent to the printing wheels for the tickets, is a stationary type plate 311 for printing on the tickets the permanent or unchangeable data such as the conditions under which the tickets are issued, the name of the stations from which they are issued, and the name of the company. The type plate 311 is provided with an opening 312 in which a cylinder 321 is adapted to oscillate. The cylinder 321 is provided on its opposite faces with type or printing characters 323 suitable for printing data indicating whether the tickets are for the going or returning journeys. The cylinder 321 is provided with pivots 322 and with a pinion 324 in mesh with a segment gear 325. The gear 325 is pivoted at 326 and one end thereof is pivotally attached at 327 to a vertically movable bar 328. The upper end of the bar 328 is guided by a plate 329 and is pulled upwardly by a spring 339.

The spring 339 also tends to rotate the cylinder 321 to a position to print suitable data on the tickets for a going or forward journey such as "Void after date," etc. The upper end of the bar 328 is provided with a thumb button 338. When this button 338 is pressed downwardly against the tension of the spring 339 the cylinder 321 is given a half revolution and is moved to a position to print suitable data on the ticket, indicating that it is for the return journey such, for example, as "Good for 10 days." The cylinder 321 is held in this set position by a latch 333 adapted to engage a projection 332 and which is pivoted at 334 and connected to an operating bar 337 pulled upwardly by a spring 331. The bar 337 is provided with a thumb-button 330 by means of which the bar 337 may be pressed downwardly and the latch 333 released thereby permitting the spring 339 to move the cylinder 321 to a "Going" printing position. The latch 333 may be automatically released when the machine is operated by a cam 336 mounted on the shaft 118. The cam 336 is adapted to engage a projection 335 on the latch to release the same. The matter printed on the ticket by the plate 311 and cylinder 321 is printed previous to the time the changeable matter is printed by the type wheels and is printed simultaneously with the changeable matter on the previously issued ticket. Consequently, when the thumb-button 338 is pressed downwardly to set the machine to print a round trip ticket, the data for the going portion thereof has been previously printed. In the present embodiment of the invention, the legend "Void after date" is used not only on the going portion of a round trip ticket but also on a one-way ticket, as will be seen from Figs. 27 and 32. When the machine is then operated, the changeable data from the type wheels will be printed on the going portion of the ticket and simultaneously the data indicating the return ticket will be printed on the return portion of the ticket. During this first operation of issuing a ticket, the cam 336 will release the cylinder 321 after the printing operation takes place. The changeable data for the return portion of the ticket will be printed at the next operation at which time a third ticket will be initially prepared which may be for a one-way ticket or the going portion of a round trip ticket.

To perforate the round trip ticket so that it may be easily torn into its two parts, the knife 242 is only partially actuated as follows: see Figs. 2 and 28: Mounted on the cross-piece 6 adjacent to the knife 242 is a guide 310 in which a bolt 304 is mounted. The bolt 304 is under the influence of springs 304' and is actuated by a lever 305 pivoted at 309 and connected to a lever 307 by a pin 306.

The lever 307 is pivoted on the shaft 184 and one end thereof lies in the path of a pin 308 on the bar 328. Whenever the bar 328 is depressed to place the machine in a condition to issue a round trip ticket, the pin 308 will actuate the levers 307 and 305 to move the bolt into the path of the flange 313 on the knife 242, thereby preventing a complete actuation of the knife and permitting the serrations 243' to perforate the ticket as is shown by the dotted lines in Fig. 32.

*The printed record and ticket*, (Figs. 26 and 27.)

In Fig. 26 I have shown the record as issued from the machine and in which column "A" is printed from the key 92. This column represents an identification mark of the operator. In column "B" is shown the day of the month in which the record is made and is printed from the type wheels 23. Column "C" shows the month of the year and is printed from type wheels 22. Column "D" shows the hour of the day in which the record was made and is printed from type wheels 21. Column "E" shows the minutes of the hours of the day and is printed from type wheels 20. Column "F" shows the total value of all the tickets issued and is printed from type wheels 18 and 19. It will be noted that the total is carried forward each time the record is made and the sum value of all the tickets issued for any one record may be ascertained by subtracting the sum total from the last printed statement of the previous record from the sum total of the last printed statement of the present record. For convenience, the sum total of the last printed statement of the previous record is shown at the bottom of column "F". Column "G" shows the serial number and is printed from the type wheels 17. Column "H" shows the class of fare and is printed from the type wheel 16. Column "I" shows the specific ticket values and is printed from type wheels 15. Column "K" shows the stations or destinations and these are obtainable from the left type 68 on the station printing drum 14. In Fig. 27, I have shown the ticket as issued from the machine, there being a ticket issued for each impression of the record. At "L" on the ticket is shown the destination to which said ticket is issued and the same is printed from the right type 68 of the station drum 14. At "N" is shown the specific ticket charge. At "O" is shown the class of fare. At "P" is shown the serial number of the ticket. At "Q" is shown the month of the year. At "R" is shown the day of the month, and at "S" is shown the year in which the ticket was issued. The permanent printed matter on the body of the ticket denotes the name of the railway company issuing the ticket and the station from which the ticket is issued, or any other matter may be printed from a plate 311 mounted on the frame 8 immediately below the type wheels of the ticket bank.

*Means for recording the number of tickets issued*, (Sheets 2, 4, 6 and 15.)

Mounted upon the shaft 76 between the frame plates 1 and 6' is a wheel 10' provided with peripheral flanges 11'. The flanges 11' provide bearings for a multiplicity of actuating shafts 12' and resetting shafts 13'. Mounted upon the shafts 12' and 13' are counters 14' consisting of type wheels of any of the well known types and which may be provided with any of the common forms of overthrow and holding means (not shown). In the present instance I have shown the counters or wheels 14' arranged in staggered relation one to the other for the sake of compactness or the utility of space, but it will be understood that the said counters may be arranged in any convenient way or manner. Each of the shafts 13' is provided with an actuator consisting in the present instance of a ratchet 15'. The said ratchets 15' may be actuated individually by the following means:

Pivoted at 16' to the frame 1 is an angular lever 17' carrying on one arm a pawl 18' controlled by a spring 19'. The pawl 18' is provided with an overthrow stop which consists of an adjusting screw 58' mounted in a convenient part of the frame 1. The pawl 18', when the lever 17' is actuated, is arranged to engage the ratchet 15' of a selected counter and to move the unit wheel element thereof to the extent of one digit. The operation of the pawl 18' and the lever 17' takes place from the main actuating mechanism of the machine by and through the following means.

The lever 17' is connected to an angular lever 20' through the agency of a slot and pin connection 21'. The lever 20' is pivoted at 22' and is under the influence of a spring 23' and is provided with a pin 24' which rides on a cam 25' and through means of which the said lever 20' is actuated. The cam 25' is attached to the gear 211 on shaft 87 and is in mesh with the gear 210 mounted on the shaft 118. The shaft 118 is actuated, as before described, from the operating crank 209 on the stud 208 through the agency of gears 206 and 207. The gears 206, 207, 210 and 211, and the crank 209 are parts of the machine as shown in my copending application. It will be seen that when the crank 209 is rotated the pawl 18' will be moved to actuate the ratchet 15' in the path thereof. There is a set of counting wheels or counters 14' for each station indicated on the periphery of the drum 78 and said counters are identified with their stations by numerals which appear opposite the indications on the drum 78 and upon raised type 32' on the flanges 11' of wheel 10'. While in the drawings I have shown one specific type of actuating means for the counters, it will be understood that the invention need not be limited to this specific type as other types may be employed with equal facility. It will be seen from the above means that whenever a station type is selected on the printing drum 14 its respective printing counter 14' will be placed in operative relation with the actuator 18', consequently, the counters 14' are capable of counting or accumulating the number of tickets issued to each of the various stations or points of destination. This is a decided advantage and greatly facilitates the work of auditing.

In order to permit the counters to be reset to zero, the resetting shafts 13' are provided with pinions 33' which mesh with a continuous rack or gear 34' mounted in a groove in the wheel 10' and held in position by a ring 35' secured to a side of the wheel 10'. The ring 35' is provided with a recess or cut-out portion 36' in which a pin 37', attached to the rack 34', is adapted to reciprocate. By reciprocating the pin 37' in the recess 36', the resetting shafts 13' of the counters will be reciprocated to an extent necessary to reset said counters to zero in a well known manner. A printed statement or record may be secured from the counters by the following means:

The faces of the counter type are inked by means of an inking roller 38' eccentrically mounted on a shaft 39' journaled in the frames 1 and 6' and provided with a shield 40' which serves to prevent the paper coming in contact with the inking roller. The shaft 39' is provided with a finger-piece 41' splined thereto and under the control of a spring 42', as shown in Fig. 35. The finger-piece 41' is provided with suitable recesses on the cylindrical part thereof to hold the inking roll 38' in a set position. The inking roller 38' is placed against the type faces by releasing the knob 41' from engagement with the projections 43' and giving the shaft 39' a half revolution which operation places the inking roller in the position shown in Fig. 36. The type are inked by rotating the wheel 10', the inking roller being in engagement with the faces of said type. After the type are thus inked, the strip of record paper is wrapped around the wheel 10' on the outside of the counters and the ends thereof are passed through a slot 44' in the periphery of said wheel and into a suitable clamping device which may consist of a shaft 45' having a slot 46' and provided with a finger 47' by means of which it may be rocked. When the ends of the paper strip are inserted in the slot 46' and the shaft 45' is partially rotated, the ends of the paper will be wound around the shaft 45' thereby drawing the paper tight around the counters. An impression may be then secured by pressing the paper strip against the type faces through the aid of a suitable platen 48' mounted upon a frame or arms 49', pivoted on a pin 50' extending from the frame 6', and under the control of cams 51'. The cams 51' are adapted to elevate and to hold the platen 48' against the type faces and are mounted upon a shaft 52' journaled in the frames 1 and 6'. On its outer end the shaft 52' is provided with a thumb piece 53' or with any other suitable means by the aid of which said shaft may be rocked. After the platen has been placed in engagement with the type the wheel 10' is rotated through the agency of the grip piece 79 which operation presses the paper strip against all of the type faces thereby securing the printed impression or record shown in Fig. 38. The mechanism is inclosed within a suitable casing 54' which is a part of the casing 52 and which is provided with a suitable door 55' which enables access to be had to the interior thereof for an insertion of the paper strip. Said casing is also provided with a door 56' which enables access to be had to the inking roller. In addition to the counters 14', the wheel 10' is provided with type wheels 57' which are adapted to print the date upon the record, as will be seen at "D" at the lower end of Fig. 38. These wheels may be set by the aid of a stylus or other suitable instrument.

Mode of operation.

Before the machine is placed in operation, the ink reservoir in the trough 265 and the inking rollers 261 are supplied with sufficient ink. The paper roll 164 for the record is placed in position within its frame 165. The record strip is passed upwardly and around the roller platen 173 and beneath the guard 264. The record strip is then inserted between the feed-rollers 174 and 175 which were previously separated by elevating the bar 195. The spool 176 is placed in position between the disk 218 and the rotating member 224. The roll of paper 161 for the ticket is placed in position within its frame 162 and the paper strip is passed upwardly and around the platen 168 and beneath the guard 264, and is then inserted between the feed rollers 169 and 170 said rollers having been previously separated by the cam lever 185. The said ticket strip is then extended out through the opening 171 in a position to be severed by the knife 242. The date and time printing wheels 9, 10, 20, 21, 22, and 23, are then set by rotating the drums 31, 32 and 37. The key 92 is then inserted in the housing 93 which operation unlocks the machine, by rocking the levers 276 and 272 thereby moving the lower end of the lever 272 out of the recess 271 in the disk 270. With the machine in this condition, a ticket may be issued. In the issuance of such ticket, the drum 78 is rotated until the indication thereon of the desired station is opposite the indicator arm 80, and when said drum is rotated, the station type drum 14 is also rotated to bring the respective type 68 of the selected station to a printing position. At the same time, the printing counter 14' of the selected station will be placed in operative relation with the actuating pawl 18'. The drum 14 is rotated from the drum 78 through the instrumentality of gears 74 and 75 and shafts 76. The fare to the selected station is then, if not previously, ascertained and the type wheels 13 and 15 for printing specific fares are set by shift levers 50. The proper extent of the movement of the levers 50 may be ascertained by the indications 53 adjacent the slots 51 in the casing 52. At the same time, the class of fare printing wheels 12 and 16 are set by shifting the levers 62. This operation unlocks the machine by shifting the lever 316 out of engagement with the ratchet 319. When the levers 50 are set, the segments 106 of the total cash counter are also set in a position to subsequently add the value of the ticket to be issued upon the counting wheels of the total cash counter. After the station and fare have been selected, the cash counter is actuated and the ticket and record printed by rotating the crank 209. During the initial movement of said crank, cams 103 release the levers 101 which causes a disengagement of the segments 98 from the gears 96, and the cams 114 permit the vertically moving bars consisting of parts 109 and 110 to fall. The extent of the downward movement of said vertically moving bars depends upon the position of the segments 106 and the extent of the downward movement of the segments 98 also depends upon the extent of the downward movement of the members 109. During the subsequent movement of the crank 209, the cams 103 rock the levers 101 to place the segments 98 in engagement with the gears 96. When the crank 209 is further rotated, the cams 114 will engage the levers 115 and elevate the vertically moving bars with their portions 109 and 110 thereby elevating the segments 98 and rotating the gears 96 an extent depending upon the previous positions to which their respective levers 50 have been set. When the gears 96 are rotated, the type wheels 18 will be rotated to a corresponding extent. When the zero mark of any one of the type wheels 18 reaches a printing position, its respective lever 126 will be shifted to a position to be engaged by its respective lever 139 which is adapted to give to the segment 98 of the next higher digit wheel a movement sufficient to add one digit to said next higher digit wheel where the vertically moving bar of the segment is elevated by its respective cam 114. During the operation of the total cash counter, the consecutive number counters 11 and 17 are actuated to the extent of one digit by the intermittent or Swiss gear 88 on the main actuating shaft 87. After the total cash counter and the consecutive number counters have been actuated, the further movement of the crank 209 will actuate the platens. During this continued movement, the cams 247 will rock the levers 249 which operation will elevate the inking rollers 261 and platen rollers 168 and 173. During the elevation of said platen rollers, the ticket and record strips are carried upwardly and are pressed against the various type, said type being previously inked by the inking roller 261. As the platen rollers 168 and 173 pass over the type they are revolved through the agency of gears 266 and 267 and rack 269 thereby securing clear and perfect impressions. After the printing operation has thus taken place, the paper strips are fed by revolving the feeding rollers 169 and 174, the rollers 169 being revolved through a train of gearing shown in Fig. 3 which consists of gears 199, 200, 203, 204, 206 and 207. The feeding rollers 174 for the record are revolved by the train of gearing shown in Fig. 4 and which consists of the gears 212, 213, 216, and a gear 217 on the shaft 118 upon which the gear 206 is mounted. Concurrent with the feeding of the record strip, the said strip is wound upon the spool 176 through the agency of gears 228 and 227 and the friction devices shown in Fig. 18. After the ticket has been completely fed, the cam 246 shown in Fig. 28 releases the lever 245 and permits the springs 243 to actuate the knife 242 to sever said ticket. After the ticket is severed, the cam 293, shown in Fig. 16, sounds the bell 288 and the end of the pawl 240, shown in Fig. 4, snaps into the recess 239 of the disk 237 thereby indicating that the operation of issuing a ticket and making a record is complete.

When it is desired to issue a second ticket, or duplicate of a former ticket, without resetting the fare printing devices, the thumb-button 158 is pushed inwardly to disengage the clutch member 149 from the gear 150 and which operation prevents the shaft 49 returning the levers 50 to normal position. A duplicate ticket may then be issued without previously setting the levers 50 by giving the crank 209 a second rotation. When it is desired to issue a round trip ticket, the operator depresses the thumb-button 338 which shifts the cylinder 321 and place the bolt 304 in the path of the flange 313 of the knife 242. When the machine is then operated twice in succession, the first ticket issued will be for the going portion of the journey while the second portion, separated from the first by perforations, will be for the return portion of the journey, as is shown in Fig. 32.

When it is desired to secure the printed record, shown in Fig. 38, from the station counters 14', the said counters 14' are first inked by the roller 38'. A strip of paper is then wrapped around the wheel 10' and the ends thereof are secured by the clamping shaft 45', and the impression is then secured by pressing the platen 48' against the type of the counters 14'.

While I have with much definiteness and particularly described my invention in order to fully comply with section 4888 of the Revised Statute relating to the grant of patents, I do not desire to be limited to unessential details of construction or arrangement which may be more or less varied without departing from the underlying principles of my invention as set forth in the introductory part of the foregoing specification.

Having described my invention, I claim:

1. In a machine of the character specified, a station printing drum, actuating and resetting shafts mounted on said drum, counters mounted on said shafts, actuating members mounted on the actuating shafts, resetting members mounted on the resetting shafts, means for actuating said actuating shafts, means for actuating said actuating members individually, and common resetting means in engagement with said resetting members.

2. In a machine of the character specified, a station or destination printing drum, counters mounted on said drum, resetting shafts for said counters, resetting members mounted on said resetting shafts, and common resetting means in engagement with said resetting members, and carried by said wheel.

3. In a machine of the character specified, a station or destination printing drum, counters mounted on said drum, resetting shafts for said counters, pinions mounted on said resetting shafts, and a continuous oscillating rack in engagement with said pinions.

4. In a machine of the character specified, a station printing drum having a slot thereon, counters mounted on said drum for recording separately the tickets issued to each station or point of destination, a paper clamp mounted on said drum and adapted to hold the ends of a strip of paper around said drum and in engagement with said counters, and an eccentrically mounted inking roller for said counters, and a pressure roll for said counters coöperating therewith in taking such records from said counters.

5. In a machine of the character specified, a wheel having a slot in an edge thereof, counters mounted on said wheel, a paper clamp mounted on said wheel and adapted to hold the ends of a strip of paper around said wheel in engagement with said counters, an eccentrically mounted inking roller for said counters, a pressure roller for said counters coöperating therewith to press said paper against said counters, actuating and resetting shafts for said counters, ratchets mounted on said actuating shafts, a pawl adapted to individually actuate said ratchets, pinions mounted on said resetting shafts, and an oscillating continuous rack in mesh with said pinions and adapted to return said counters to zero.

6. In a machine of the character specified, a printing wheel, setting means for moving said wheel to a printing position, impression mechanism coöperating with said wheel, and a cam actuated by said setting mechanism and controlling said impression mechanism.

7. In a machine of the character specified, a printing wheel, setting means for said wheel, impression mechanism for said wheel, a cam actuated from said setting means, and a lever actuated by said cam and controlling said impression mechanism.

8. In a machine of the character specified, a type cylinder, a spring controlling the movement of said cylinder, a bar adapted to shift said cylinder in one direction, a latch adapted to hold said cylinder in a set position against the tension of said spring, means for manually releasing said latch, a platen for said cylinder, and actuating means for said platen adapted to automatically release said latch.

9. In a machine of the character specified, a type cylinder, a segment gear adapted to shift said cylinder, a manually operated bar connected to said gear, a spring influencing the movement of said cylinder, a latch adapted to hold said cylinder in a set position against the tension of said spring, a platen for said cylinder, actuating means for said platen, and a cam carried by said actuating means and adapted to release said latch.

10. In a machine of the character specified, a type cylinder, a pinion mounted on said cylinder, a segment gear in mesh with said pinion, a manually operated bar connected to said segment gear, a spring influencing the movement of said cylinder, a latch adapted to hold said cylinder in a set position against the tension of said spring, means for manually releasing said latch, a platen for said cylinder, actuating means for said platen, and a cam carried by said actuating means and adapted to release said latch.

11. In a machine of the character specified, a serrated knife, a spring adapted to move said knife in one direction, a lever adapted to move said knife in the opposite direction, a bolt adapted to limit the movement of said knife, setting means for said bolt, and actuating means adapted to move said lever and to release said setting means.

12. In a machine of the character specified, a shiftable printing member, a serrated knife, a spring adapted to move said knife in one direction, a cam adapted to move said knife in the opposite direction, a bolt adapted to limit the movement of said knife, setting means for said bolt, a segment gear connecting said printing member and said setting means, a latch adapted to hold said setting means in a set position, actuating means for said cam, and means carried by said actuating means and adapted to actuate said latch.

13. In a machine of the character specified, a shiftable printing member, a serrated knife, a spring adapted to move said knife in one direction, a cam adapted to move said knife in the opposite direction, a bolt adapted to limit the movement of said knife, setting means for said bolt, a segment gear connecting said printing member and said setting means, a latch adapted to hold said setting means in a set position, a bar adapted to manually release said latch, actuating means for said cam, and a second cam carried by said actuating means and adapted to release said latch.

14. In a machine of the character specified, the combination of a rotatable drum having a plurality of longitudinal grooves in the periphery thereof, and a corresponding number of type carrying bars mounted in said grooves and from which impressions are taken designating the stations to which tickets are sold, impression devices coöperating with said type, means for projecting each type bar beyond the adjacent type bars when selected for an impression, and a counter for each type bar upon which is accumulated the number of tickets printed from each type bar.

15. In a machine of the character specified, the combination of a rotatable drum having a plurality of longitudinal grooves in the periphery thereof, and a corresponding number of type carrying bars mounted in said grooves and from which impressions are taken designating the stations to which tickets are sold, impression devices coöperating with said type, means for projecting each type bar beyond the adjacent type bars when selected for an impression, a printing counter for each type bar upon which is accumulated the number of tickets printed from each type bar, and an actuator in operative relation with said counter when its respective type bar is projected, said actuator being movable in unison with said impression devices.

16. In a machine of the character specified, the combination of a rotatable drum having a plurality of closely arranged parallel grooves in the periphery thereof, a plurality of bars each of which contains duplicate characters mounted in said grooves, means for indexing said drum to bring a selected type bar to a printed position, means for projecting one of said type bars longitudinally beyond the adjacent type bars, means for taking duplicate impressions from said type bars, counters for said type bars movable by said indexing means and adapted to accumulate the number of tickets printed from each type bar, and an actuator for said counters in operative relation with the counter corresponding to the projected type bar, said actuating means movable in unison with said impression mechanism.

17. In a machine of the character specified, the combination of a rotatable drum having a plurality of longitudinal grooves in the periphery thereof, and a corresponding number of type carrying bars mounted in said grooves and from which impressions are taken designating the stations to which tickets are sold, impression devices coöperating with said type, means for projecting each type bar beyond the adjacent type bars when selected for an impression, and a counter for each type bar upon which is accumulated the number of tickets printed from each bar, and means for resetting said counters to zero comprising an annular rack engaging with the driving pinions of said counters and a finger piece on said annular rack for operating the same to move to actuate said counters.

18. In a machine of the character specified, the combination of a rotatable drum having a plurality of longitudinal grooves in the periphery thereof, and a corresponding number of type carrying bars mounted in said grooves and from which impressions are taken designating the stations to which tickets are sold, impression devices coöperating with said type, means for projecting each type bar beyond the adjacent type bars when selected for an impression, a counter for each type bar upon which is accumulated the number of tickets printed from each type bar, and common resetting means for resetting said counters collectively.

19. In a machine of the character specified, the combination of a rotatable drum having a plurality of longitudinal grooves in the periphery thereof, and a corresponding number of type carrying bars mounted in said grooves and from which impressions are taken designating the stations to which tickets are sold, impression devices coöperating with said type, means for projecting each type bar beyond the adjacent type bars when selected for an impression, a counter for each type bar upon which is accumulated the number of tickets printed from each type bar, an actuator in operative relation with said counter when its respective type bar is projected, and means for resetting said counters comprising an annular rack carried by the main counter supporting wheel and in mesh with the pinions of said counters.

20. In a machine of the character specified, the combination of a rotatable drum having a plurality of longitudinal grooves in the periphery thereof, and a corresponding number of type carrying bars mounted in said grooves and from which impressions are taken designating the stations to which tickets are sold, impression devices coöperating with said type, means for projecting each type bar beyond the adjacent type bars when selected for an impression, a counter for each type bar upon which is accumulated the number of tickets printed from each type bar, an actuator in operative relation with said counter when its respective type bar is projected, and common resetting means for resetting said counters collectively.

21. In a machine of the character specified, the combination of a rotatable drum having a plurality of longitudinal grooves in the periphery thereof, and a corresponding number of type carrying bars mounted in said grooves and from which impressions are taken designating the stations to which tickets are sold, impression devices coöperating with said type, means for projecting each type bar beyond the adjacent type bars when selected for an impression, a counter for each type bar upon which is accumulated the number of tickets printed from each type bar, an actuator in operative relation with said counter when its respective type bar is projected, and said actuator being movable in unison with said impression devices comprising an annular rack carried upon the wheel upon which said counters are mounted and engaging the pinions of said counters, and a finger piece on said rack whereby it is operated to set the counters to zero.

22. In a machine of the character specified, the combination of a rotatable drum having a plurality of longitudinal grooves in the periphery thereof, and a corresponding number of type carrying bars mounted in said grooves and from which impressions are taken designating the stations to which tickets are sold, impression devices coöperating with said type, means for projecting each type bar beyond the adjacent type bars when selected for an impression, a counter for each type bar upon which is accumulated the number of tickets printed from each type bar, an actuator in operative relation with said counter when its respective type bar is projected, said actuator being movable in unison with said impression devices, and common resetting means for resetting said counters collectively.

23. In a machine of the character specified, the combination of a rotatable drum having a plurality of longitudinal grooves in the periphery thereof, of a corresponding number of type carrying bars mounted in said grooves and from which duplicate impressions are taken designating the station to which tickets are sold, space members supported on said bars and separating the printing characters supported thereon, means for maintaining the printed characters on said bars, impression devices coöperating with said type, means for projecting each type bar beyond the adjacent type bars when selected for an impression, a printing counter for each type bar upon which is accumulated the number of tickets printed from each type bar, and means for resetting said counters.

24. In a machine of the character specified, the combination with a rotatable drum having a plurality of longitudinal peripheral grooves, a corresponding number of type carrying bars mounted in said grooves and from which impressions are taken of the points or designations to which tickets are sold or issued, means for indexing said drum to bring any selected type bar to a printed position, a cam arranged to engage such selected type bar to move the same beyond the adjacent type bars, and counters for each type bar movable by said indexing means and adapted to accumulate the number of tickets printed from each type bar, and means for resetting said counters comprising an annular rack engaging the pinions of said counters.

25. In a machine of the character specified, the combination with a rotatable drum having a plurality of longitudinal peripheral grooves, a corresponding number of type carrying bars mounted in said grooves and from which impressions are taken of the points or designations to which tickets are sold or issued, means for indexing said drum to bring any selected type bar to a printed position, a cam arranged to engage such selected type bar to move the same beyond the adjacent type bars, counters for each type bar movable by said indexing means and adapted to accumulate the number of tickets printed from each type bar, and common resetting means for resetting said counters collectively.

26. In a machine of the character specified, the combination of a rotatable drum having a plurality of closely arranged parallel grooves in the periphery thereof, a plurality of bars each of which contains duplicate characters mounted in said grooves, means for indexing said drum to bring a selected type bar to a printed position, means for projecting one of said type bars longitudinally beyond the adjacent type bars, means for taking duplicate impressions from said type bars, a counter for each type bar upon which is accumulated the number of tickets printed from each type bar, and means for resetting said counters comprising an annular rack in mesh with the pinions of said counters.

27. In a machine of the character specified, the combination of a rotatable drum having a plurality of closely arranged parallel grooves in the periphery thereof, a plurality of bars each of which contains duplicate characters mounted in said grooves, means for indexing said drum to bring a selected type bar to a printed position, means for projecting one of said type bars longitudinally beyond the adjacent type bars, means for taking duplicate impressions from said type bars, a counter for each type bar upon which is accumulated the number of tickets printed from each type bar, and common resetting means for resetting said counters collectively.

28. In a machine of the character specified, duplicate means for printing the destinations or stations on tickets and records thereof, duplicate means for printing the price on both tickets and records, duplicate means for printing the serial numbers on the tickets, duplicate means for printing the class of the tickets thereon, impression mechanism for said printing means, counters for accumulating the number of tickets issued to each station movable in unison with said station printing means and actuated concurrently with said impression mechanism.

29. In a machine of the character specified, means for printing the destinations or stations on tickets, means for printing the price of each ticket thereon, means for printing the serial numbers on the tickets, means for printing the class of the tickets thereon, means for identifying the person issuing the tickets with said tickets, means for printing round trip tickets, impression mechanism for said printing means, counters for accumulating the number of tickets issued to each station movable in unison with said station printing means and actuated concurrently with said impression mechanism.

30. In a machine of the character specified, means for printing the destinations or stations on tickets, means for printing round trip tickets, impression mechanism for said printing means, counters for accumulating the number of tickets issued to each station movable in unison with said station printing means and actuated concurrently with said impression mechanism.

31. In a machine of the character specified, means for printing the destinations or stations on tickets, means for printing round trip tickets, means for printing the class of the tickets thereon, impression mechanism for said printing means, counters for accumulating and printing the number of tickets issued to each station movable in unison with said station printing means and actuated concurrently with said impression mechanism.

32. In a machine of the character specified, means for printing the destinations or stations on tickets, means for printing round trip tickets, means for printing the class of the tickets thereon, means for printing the price of each ticket thereon, impression mechanism for said printing means, counters for accumulating the number of tickets issued to each station movable in unison with said station printing means and actuated concurrently with said impression mechanism.

In testimony whereof I affix my signature, in presence of two witnesses.

JOHN F. OHMER.

Witnesses:
MELLIE GALLOWAY,
R. J. MCCARTY.